US006937430B2

(12) United States Patent
Ge et al.

(10) Patent No.: US 6,937,430 B2
(45) Date of Patent: Aug. 30, 2005

(54) ROBUST TRIPLE-MODE COMPENSATOR FOR HARD DISK DRIVES WITH DYNAMIC FRICTION

(75) Inventors: Shuzhi Ge, Singapore (SG); Yaolong Lou, Singapore (SG); Tong Heng Lee, Singapore (SG); Chun-Hung Tony Huang, Singapore (SG); Teck Seng Low, Singapore (SG)

(73) Assignee: National University of Singapore, Singapore (SG)

( * ) Notice: Subject to any disclaimer, the term of this patent is extended or adjusted under 35 U.S.C. 154(b) by 251 days.

(21) Appl. No.: 10/169,864

(22) PCT Filed: Jan. 10, 2001

(86) PCT No.: PCT/SG01/00002

§ 371 (c)(1),
(2), (4) Date: Nov. 8, 2002

(87) PCT Pub. No.: WO01/52246

PCT Pub. Date: Jul. 19, 2001

(65) Prior Publication Data

US 2003/0128458 A1 Jul. 10, 2003

(30) Foreign Application Priority Data

Jan. 11, 2000  (SG) ........................................ 200000097

(51) Int. Cl.[7] .............................................. G11B 5/596
(52) U.S. Cl. ............................... 360/78.06; 360/78.09; 360/77.02; 318/561
(58) Field of Search ........................... 360/78.06, 78.09, 360/78.07, 78.04, 77.02; 318/560, 561

(56) References Cited

U.S. PATENT DOCUMENTS 4,697,127 A * 9/1987 Stich et al. ................. 318/561
5,369,345 A * 11/1994 Phan et al. .................. 318/561
6,014,285 A * 1/2000 Okamura .................. 360/78.04
6,510,016 B1 * 1/2003 Hattori ..................... 360/77.02
6,738,220 B1 * 5/2004 Codilian ................... 360/78.04
6,751,043 B2 * 6/2004 Magee et al. ............. 360/77.02

FOREIGN PATENT DOCUMENTS

GB        2 328 780 A       3/1999

* cited by examiner

Primary Examiner—David Hudspeth
Assistant Examiner—Dan I Davidson

(57) ABSTRACT

Friction existing between any two surfaces having relative motion is nonlinear, multiform, and is difficult to model. Nonlinear friction in the actuator pivot of a hard disk drive (HDD) limits the low frequency gain, which prevents the system positioning accuracy from further improvement. This problem is much more pronounced for the severe nonlinearity at the micrometer level. The conventional two-mode proximate time optimal servomechanism (PTOS) is inadequate for immediate future hard disk drives because of the existence of restrictions in the particular design approach. A triple-mode control scheme, and its variations, as presented herein, include (a) a proximate time-optimal controller (PTOC) having a relatively large output is used for track seeking, (b) a robust compensator having a relatively small output is used for track following to compensate for friction and other nonlinearities, and (c) a bridging (connection) control to guarantee the continuity of the control signals. Because of the introduction of an extra mode, additional freedoms for controler design are made available for improved performance. The robust compensator is non-model based in the sense that it does not depend on the models of friction and other nonlinearities. This makes the invention simpler and more practical than conventional systems.

19 Claims, 23 Drawing Sheets

ROBUST TRIPLE-MODE COMPENSATOR FOR HARD DISK DRIVES WITH DYNAMIC FRICTION

FIELD OF THE INVENTION

The present invention generally relates to servo systems, and, in particular, relates to methods and systems of robust servo control of high density hard disk drives with dynamic friction in order to further improve positioning accuracy and increase the robustness of servo systems.

BACKGROUND OF THE INVENTION

Description of the Related Art

Discussion of the Problem to be Solved

Owing to the rapidly increasing demands for high capacity and performance of hard disk drives from industry, servo engineers are required to develop more advanced control strategies. It is projected that the position accuracy of hard disk drives will reach 25,000 tracks per inch (TPI) (less than 1 µm per track) at the end of this century. (See, for example, K. K. Chew, *Control system challenges to high track density magnetic disk storage, IEEE Transactions on Magnetics*, Vol. 32, 1996, pages 1799–1804.) For a system with such a high accuracy requirement, some nonlinearities currently being neglected or simplified in control system design must be taken into account and reconsidered. The nonlinearities preventing the system accuracy of a hard disk drive from further improvement include the ribbon flexibility, the windage, and the nonlinear friction of the actuator pivot of a hard disk drive.

Friction depends on many factors such as the asperity of contact surfaces, lubrication, velocity, temperature, the force orthogonal to the relative motion, and even the history of motion. Friction is a natural phenomenon that is very hard, if not impossible, to model and that has not yet been completely understood. Friction is generally considered having two different manifestations, i.e., the pre-sliding friction and the sliding friction. (See, for example, B. Armstrong-Hélouvry, P. Dupont and C. Canudas de Wit, *A survey of models, analysis tools and compensation methods for control of machines with friction, Automatica*, Vol. 30, No. 7, 1994, pages 1083–1138.) In the pre-sliding stage, which is usually in the range of less than $10^{-5}$ meters, friction is dominated by the elasticity of the contacting asperity of surfaces. Friction not only depends on both position and velocity of motion, but also exhibits nonlinear dynamic behavior such as hysteresis characteristics with respect to position and velocity as observed by many researchers. (See, for example, B. Armstrong-Hélouvry, et al, *A survey of models, analysis tools and compensation methods for control of machines with friction*, cited above; D. Abramovitch, F. Wang and G. Franklin, *Disk drive pivot nonlinearity modeling part I: frequency domain, Proceedings of the American Control Conference*, Baltimore, Md., June 1994, pages 2600–2603; F. Wang, T. Hust, D. Abramovitch and G. Franklin, *Disk drive pivot nonlinearity modeling part II: time domain, Proceedings of the American Control Conference*, Baltimore, Md., June 1994, pages 2604–2607; K. Eddy and W. Messner, *Dynamics affecting tracking bias in hard disk drive rotary actuators, Proceedings of the American Control Conference*, Seattle, Wash., June 1995, pp. 1055–1060; and C. Canudas de Wit, H. Olsson, K. J. Åstrom and P. Lischinsky, *A new model for control of systems with friction, IEEE Transactions on Automatic Control*, Vol. 40, No. 3, 1995, pages 419–25.) In the sliding stage, friction is dominated by the lubrication of the contacting surfaces and introduces damping into the system. Friction in the sliding stage is usually represented by various functions of velocity.

The problem associated with friction in hard disk drives has been observed widely by manufacturers. Recently, friction has received more attention due to the new challenges for the high density mass storage techniques in the near future (See, for example, B. Armstrong-Hélouvry, et al, *A survey of models, analysis tools and compensation methods for control of machines with friction*, cited above; D. Abramovitch, et al., *Disk drive pivot nonlinearity modeling part I: frequency domain*, cited above; and F. Wang, et al., *Disk drive pivot nonlinearity modeling part II: time domain*, cited above.) The problems due to friction in hard disk drives are summarized as follows:

Nonlinear friction lowers system gain in the low frequency range. It has been observed experimentally that the open-loop low frequency gain decreases as the input amplitude decreases, while the cut-off frequency increases as the input amplitude decreases, as shown in FIG. 1(a) and FIG. 1(b). (See, for example, K. Takaishi, T. Imamura, Y. Mizoshita, S. Hasegawa, T. Ueno and T. Yamada, *Microactuator control for Disk Drive, IEEE Transactions on Magnetics*, Vol. 32, No. 3, May 1996, pages 1863–1866.)

Friction is a dynamic and nonlinear phenomenon, which depends on many factors including the asperity of contact surfaces, lubrication, velocity, temperature, the force orthogonal to the relative motion, and even the history of motion.

Friction exhibits hysteresis characteristics with respect to both position and velocity.

Due to the nonlinearity and complexity of friction, it is very difficult, if not impossible, to obtain a true friction model.

For a hard disk drive with positioning accuracy in the micrometer range or higher, friction dynamics in the pre-sliding stage cannot be neglected in control system design. Friction can cause many undesired effects such as steady state errors, tracking lag, and limit cycles in a servo system. For HDD control, one of the important tasks during the track following stage is to reduce the steady state error for improved positioning accuracy because friction reduces system gain in the low frequency range. In view of the difficulty in obtaining a true friction model, a non-model based robust friction compensation method and its variations for implementation are introduced in the present invention, as will be discussed below. To break the restrictions inherent in the traditional Proximate Time-Optimal Servomechanism (PTOS), a triple-mode control scheme and its variations are presented, which introduce extra degrees of freedom in controller design and at the same time, guarantee the continuity of the control signals.

Discussion of Previous Solutions

The positioning control system of the read/write head of a hard disk drive has two tasks: (a) track seeking and (b) track following. In the track seeking stage, the head is forced to move to the target track as quickly as possible. In the track following stage, the head is positioned precisely at the target track.

Integral Control and Observer-based Bias Compensation

The Proximate Time-Optimal Servomechanism (PTOS) is widely employed in the disk drive industry. (See, for example, G. F. Franklin, J. D. Powell and M. L. Workman, *Digital Control of Dynamic Systems*, Second Edition, Addison-Wesley, 1990.) In a PTOS, the controller switches between two modes: a Proximate Time-Optimal Controller (PTOC) mode for fast seeking when the position error is large, and a linear proportional derivative (PD) controller mode for track following when the position error is within a predefined threshold. Because friction limits the system gain in the low frequency range, the PTOS cannot satisfy the high precision requirement for the new generation of hard disk drives. To solve this problem, the commonly used techniques are (1) integral control and (2) observer-based compensation. (See, for example, G. F. Franklin, et al., *Digital Control of Dynamic Systems*, cited above.) However, it is well known that an integral control in the positioning system with friction leads to limit cycles. (See, for example, B. Armstrong-Hélouvry, et al, *A survey of models, analysis tools and compensation methods for control of machines with friction*, cited above; and B. Armstrong and B. Amin, *PID control in the presence of static friction: a comparison of algebraic and describing function analysis, Automatica*, Vol. 32, No. 5, 1996, pages 679–692.) The observer-based compensation technique was derived under the assumption that the disturbance is a constant bias such that the derivative of the disturbance with respect to time is zero. Unfortunately, in the micrometer level, the dynamics of friction cannot be neglected.

Model-based Friction Compensation

If an accurate friction model can be obtained, a feedforward path can remove the influence of friction. Therefore, suitable friction models for controller design were investigated. (See, for example, D. Abramovitch, et al., *Disk drive pivot nonlinearity modeling part I: frequency domain*, cited above; F. Wang, et al., *Disk drive pivot nonlinearity modeling part II: time domain*, cited above; and K. Eddy, et al., *Dynamics affecting tracking bias in hard disk drive rotary actuators*, cited above.) However, because friction is a complex physical phenomenon which depends on many factors such as the asperity of the contacted surfaces, the situation of lubrication and the temperature, it is difficult to obtain a true model to describe all the physical behaviors of friction. It was found that friction models obtained cannot describe the system behaviors in both frequency and time domains simultaneously. (See, for example, F. Wang, et al., *Disk drive pivot nonlinearity modeling part II: time domain*, cited above; and K. Eddy, et al., *Dynamics affecting tracking bias in hard disk drive rotary actuators*, cited above.)

Non-model Based Friction Compensation

Since it is very difficult to obtain a complete friction model, non-model based schemes have been explored. Non-model based compensation schemes can be classified into (1) robust methods and (2) adaptive and learning methods. The usually complicated adaptive and learning methods are not considered to be suitable for the control system of disk drives, which are preferred to be small, simple, compact, reliable and economical. Robust friction compensation has been investigated based on the property of static friction. (See, for example, S. C. Southward, C. J. Radeliff and C. R. MacCluer, *Robust nonlinear stick-slip friction compensation, ASME Journal of Dynamic Systems, Measurement, and Control*, Vol. 113, 1991, pages 639–645. This property does not hold for dynamic friction, which exhibits hysteretic characteristics with respect to both velocity and position.

In summary, a robust, simple and practical solution which can compensate for the effects of friction for hard disk drives is needed.

SUMMARY OF THE INVENTION

The principal object of the present invention is to provide a method and a system that improve the system performance of a hard disk drive for both track seeking and track following.

It is also an object of the present invention to provide a method and a system that overcome the problem of low frequency gain decrease due to friction and thus further improve the positioning accuracy of disk drives.

Another object of the present invention is to provide a method and a system which are also robust to other system nonlinear torque disturbances in disk drives, such as windage and ribbon cable elasticity.

Still another object of the present invention is to provide a method and a system that break the limitation in the conventional PTOS design by introducing an additional mode for extra degrees of freedom in controller design and to improve performance.

Still yet another object of the present invention is to provide a method and a system that provide continuous control signals when controllers switch across modes.

A further object of the present invention is to provide a method to compensate for system nonlinear torque disturbances more effectively, more robustly, more simply and practically.

The foregoing objectives are accomplished by a triple-mode control scheme in accordance with the present invention. The triple-mode control scheme has a conventional PTOC for fast track seeking, a robust compensator for high precision track following, and a bridging control to ensure the continuity of the control signals. In particular, the following measures in the preferred embodiment of the present invention are taken:

A conventional proximate time optimal controller is used for track seeking, which outputs a relatively large signal.

A robust compensator compensates for dynamic friction, which outputs a relatively small control torque.

A bridging control ensures the continuity of the control signals for smooth transition.

The switching of the triple mode controller is manipulated by the absolute value of the position error.

The control signals of the triple mode controller are ensured to be continuous.

The present invention does not need a mathematical model of the system nonlinearity, which makes this invention simpler and more practical.

The robust compensator not only compensates for friction but also attenuate the influences of other bounded nonlinearities, which makes this invention more robust.

One aspect of the present invention is a method to control a disk drive having a head for reading or writing data from a disk, a moveable actuator motor to provide output torque for positioning the head relative to a pre-selected data track on the disk, and a disk drive servo system that provides a command signal to the actuator motor. The disk drive servo system includes a head position signal generator responsive to the position of the head and a position controller that generates the command signal to the power amplifier to move the head to a desired position. The method comprises (1) operating the position controller as a proximate time-optimal controller (PTOC) during a track seeking mode to rapidly move the head to a selected track; (2) operating the position controller as a robust compensator during a track following mode to compensate for torque disturbances; and (3) operating the position controller in a continuous bridge mode when transitioning from the track seeking mode to the track following mode to provide continuity of the command signals to the actuator motor when transitioning from the track seeking mode. Preferably, the position signal generator and the position controller form a position loop, and the act of operating the position controller as a robust compensator comprises (a) determining a bandwidth of the torque disturbances; and (b) selecting one of a lead compensator, a lag compensator, or a lag-lead compensator to change the shape of the frequency response of the position loop.

Another aspect of the present invention is a servo control system incorporated in a disk drive assembly having a head for reading or writing data from a disk, a moveable actuator motor to provide output torque for positioning the head relative to a pre-selected data track on the disk, and a disk drive servo system that provides a command signal to the actuator motor. The disk drive servo system includes a head position signal generator that generates a head position signal responsive to the position of the head and a head position controller that generates the command signal. A state observer is responsive to the command signal and to the head position signal to provide an observed position signal. The servo control system comprises (1) a proximate time-optimal controller (PTOC) that operates in a first mode for track seeking to rapidly move the head to a desired track; (2) a robust compensator that operates in a second mode for track following, the robust compensator including compensation for nonlinear torque disturbances; and (3) a continuous bridge that operates in a third mode between the first mode and the second mode to provide a continuous transition from the first mode to the second mode. Preferably, the head position controller, the head position signal generator and the state observer comprise a position loop, and the robust compensator comprises one of a lead compensator, a lag compensator, or a lag-lead compensator to change the shape of the frequency response of the position loop.

BRIEF DESCRIPTION OF THE DRAWINGS

The present invention will be described below in connection with the attached drawing figures, in which:

FIG. 14 (comprising FIGS. 14(a), 14(b) and 14(c)) illustrates the simulated dynamic characteristics of friction, wherein

FIG. 15 (comprising FIGS. 15(a) and 15(b)) illustrates the torque and position disturbance signals used in the simulation, wherein

DETAILED DESCRIPTION OF THE PREFERRED EMBODIMENTS OF THE PRESENT INVENTION

PTOS Description

To satisfy both the requirements for track seeking and for track following, the Proximate Time-Optimal Servomechanism (PTOS) is widely employed in disk drive industry. (See, for example, G. F. Franklin, et al., *Digital Control of Dynamic Systems*, cited above.) In the PTOS controller, a nonlinear control function saturates the current amplifier to accelerate the target seeking if the position error is larger than a predefined threshold, and switches to linear control for track following when the position error is smaller than the threshold.

Figure 1A:
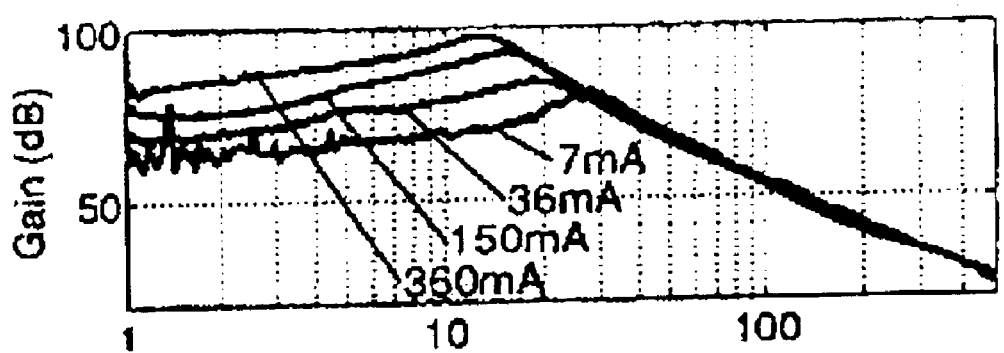
FIG. 1 (comprising FIGS. 1(a) and 1(b)) illustrates the experimental frequency responses of a VCM actuator in a hard disk drive with dynamic friction.
Figure 1B:
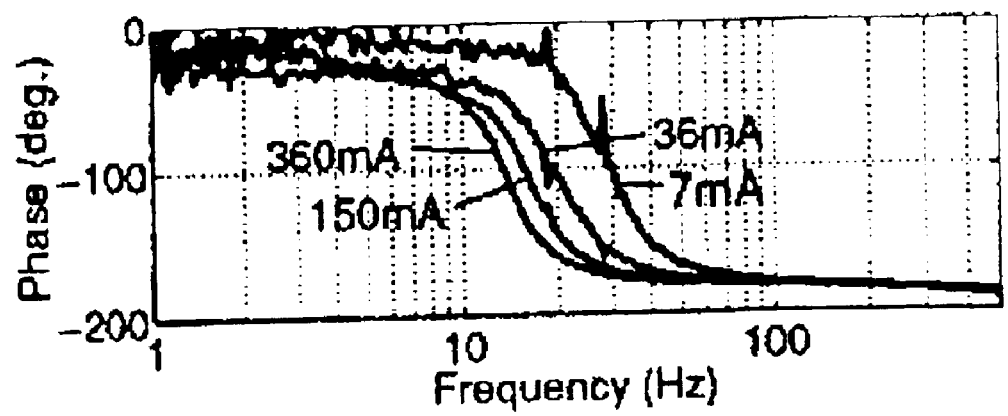
Figure 2:
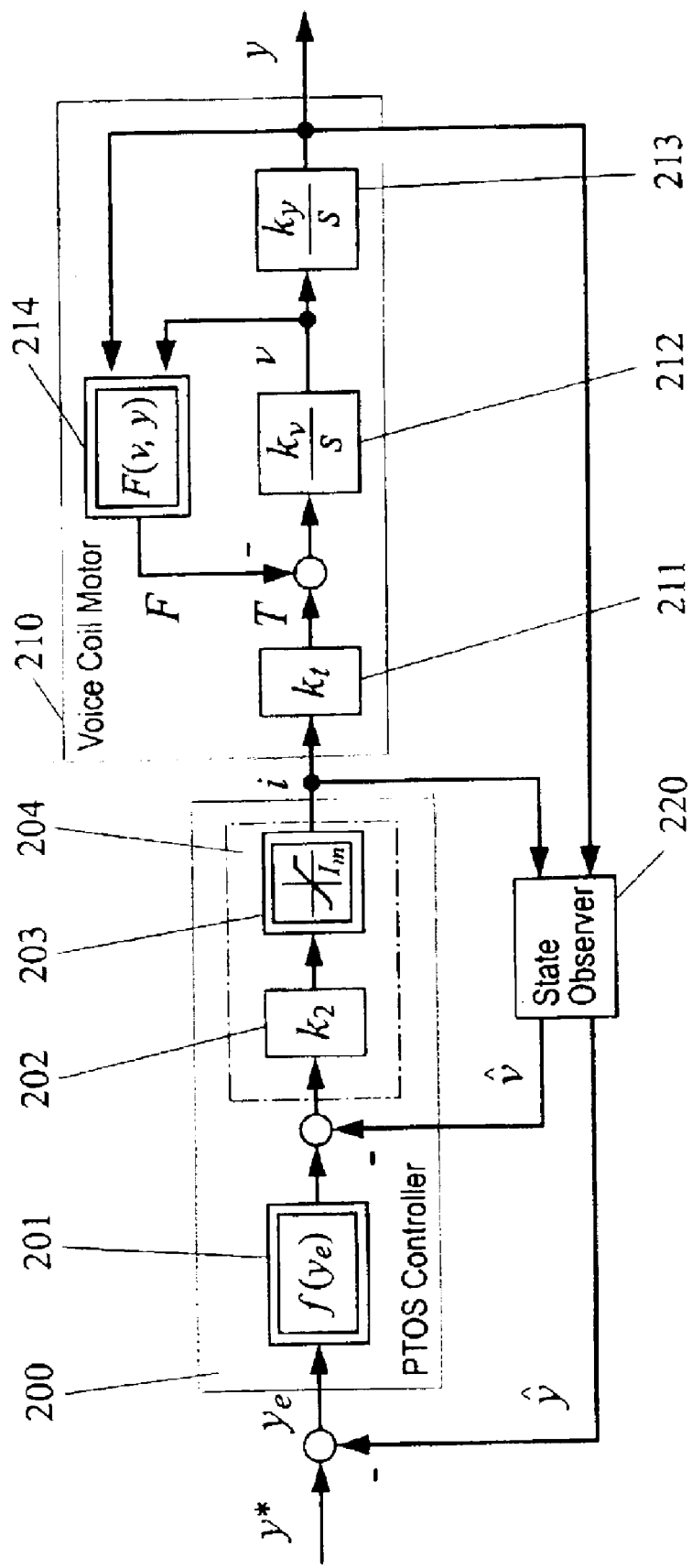
FIG. 2 illustrates a schematic diagram of the proximate time-optimal servomechanism (PTOS) for hard disk drive control.

FIG. 2 illustrates a block diagram of the PTOS controller 200 of a hard disk drive, where y is the position signal, y* is the desired signal, $y_t$, is the reference position, $\hat{y}$ is the observed position, v is the velocity signal, v* is the desired velocity, v̂ is the observed velocity, and $y_e$ is the position error. The PTOS controller 200 provides the current command to the Voice Coil Motor (VCM) 210. The State Observer 220 is used to construct the necessary state variables for the PTOS controller 210 since only the position and current are measurable in a hard disk drive. In the PTOS controller 200, the nonlinear function $f(y_e)$ 201 of the position error $y_e$ manipulates the mode switching to provide the reference velocity to the velocity control loop. A velocity controller 204 comprises a gain $k_2$ 202 and a saturation function 203 with limits of $\pm I_m$. The velocity controller 204 feeds the reference current to the VCM 210. The VCM 210 produces a drive torque T caused by the current i multiplied by a torque constant $k_t$ 211. The drive torque T, reduced by the nonlinear friction $F(v,y)$ 214, acts as the input to the mechanical dynamics represented by two integrators: an integrator 212 with a gain $k_v$; and an integrator 213 with a gain $k_y$. The mechanical dynamics generates the system velocity ω and the system position y. Note that $k_v$ and $k_y$ are the corresponding constants of the system because v and y are all expressed in electrical quantities for the ease of implementation. The nonlinear friction $F(v,y)$ 214 is a function of the system velocity ω and the system position y.

The nonlinear function $f(y_e)$ 201 is mathematically described by:

$$f(y_e) = \begin{cases} \frac{k_1}{k_2} y_e, & \text{for } |y_e| \leq y_l \\ sgn(y_e)\left(\sqrt{\frac{2\alpha I_m k_l k_v}{k_y}|y_e|} - \frac{I_m}{k_2}\right), & \text{for } |y_e| > y_l \end{cases}$$

Figure 3:
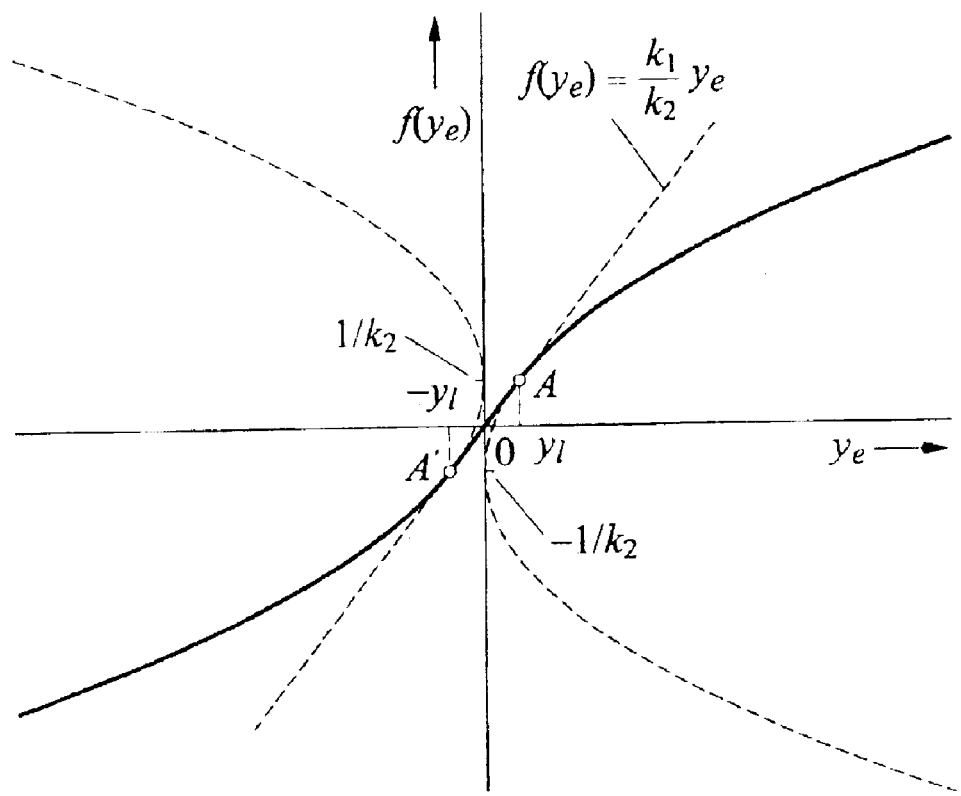
FIG. 3 illustrates the two position control modes (Proximate Time Optimal Control and PD Control) in the PTOS.

The nonlinear function $f(y_e)$ 201 is graphically shown in FIG. 3, where $0<\alpha<1$ is a factor describing the degree of approximation of the time-optimal control and $y_l$ is the position error threshold. When $|y_e|>y_l$, then $f(y_e)$ is shown by the part of the parabola in the solid line, up and to the right from a point A, and down and to the left from a point A'. When $|y_e| \leq y_l$, then $f(y_e)$ is shown by the straight line passing through the origin between the point A and the point A'.

To ensure the continuity and smoothness of the control signals during the switching between the two control modes, the position gain $k_1$ in the nonlinear function $f(y_e)$ 201 and the velocity gain $k_2$ 202 should satisfy the following conditions:

$$2k_l k_y = \alpha k_2^2 k_l k_v \quad (2)$$

$$y_l = \frac{I_m}{k_l} \quad (3)$$

Satisfying the two conditions, guarantees that the tangents of the parabola at the points A and A' coincides with the straight line at the two points.

In the track following mode (i.e., when $|y_e| \leq y_l$ and $f(y_e)=k_1 y_e/k_2$), the controller turns into a linear PD controller. The system dynamics shown in FIG. 2 is described by:

$$\dot{v} = \left(\frac{k_1}{k_2} y_e - \hat{v}\right) k_2 k_l k_v - F(v, y) k_v \quad (4)$$

At the steady state, when $\hat{v}=v=0$ and $\dot{v}=0$, there exists a steady state error given by:

$$y_e = \frac{F(v, y)|_{v=0}}{k_l k_i} \quad (5)$$

The steady state error can be reduced by increasing the position gain $k_1$ as shown in Equation (5). However, as $k_1$ increases, $y_l$ decreases. The system approaches time-optimal servo and becomes less robust. In addition, an increase in $k_1$ also leads to an increase in $k_2$ as can be seen from condition in Equation (2) for the continuity and smoothness of the control signal, and subsequently enlarges the system bandwidth shown in FIG. 4. In practice, several resonance frequencies due to flexibility of the actuator arm exist in high frequency range. These resonance frequencies are not allowed to be excited when in operation. If $k_2$ is chosen such that the system bandwidth cannot be enlarged further, then $k_1$ is uniquely determined according to Equation (2) for smooth switching between two control modes. The steady state error in Equation (5) cannot be reduced or removed in this PTOS control scheme.

In fact, the condition in Equation (2) is very restrictive for the gain in the position loop. Since $0<\alpha<1$, the maximum gain in the position loop is limited to a half of the gain in the speed loop as shown by:

$$K_p = \frac{k_1}{k_2} k_y = \frac{\alpha}{2} k_2 k_l k_v = \frac{\alpha}{2} K_v \leq \frac{1}{2} K_v \quad (6)$$

Figure 4:
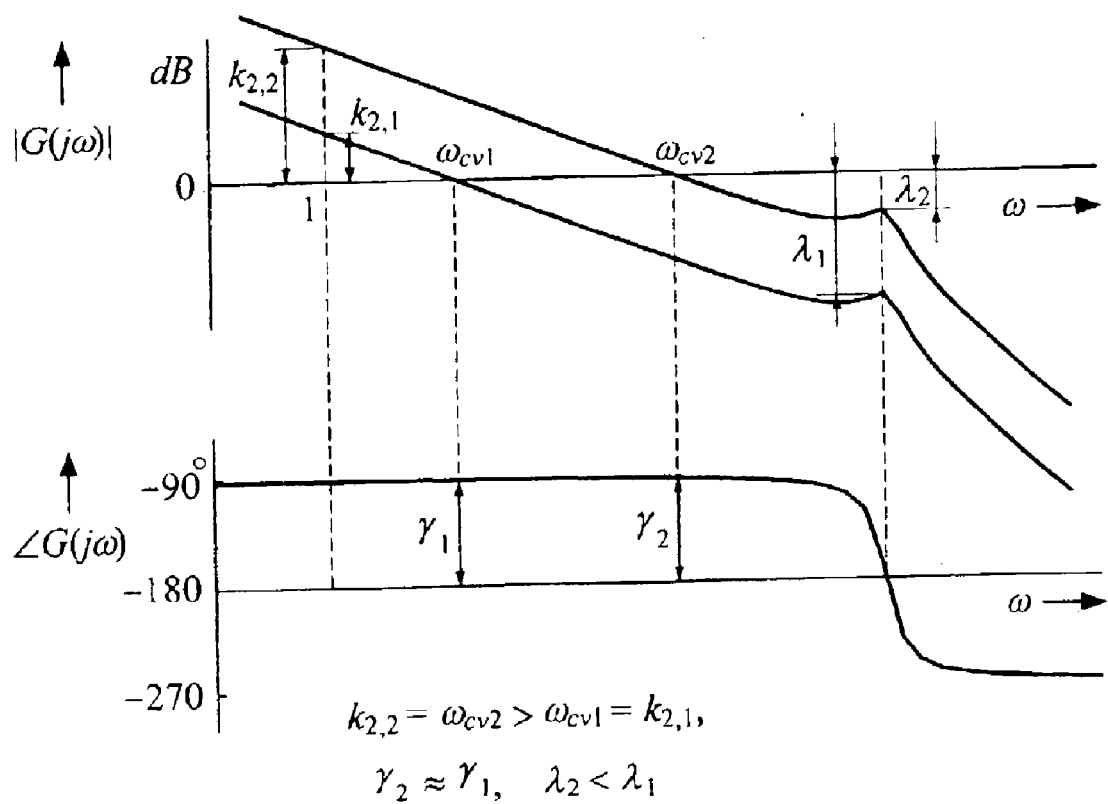
FIG. 4 illustrates the relationship between the gain and bandwidth in the speed feedback loop.

In Equation (6), $K_p$ and $K_v$ are the equivalent gains in the position and velocity loops respectively. From the theory of control system design, the position loop is a type-1 servo system, whose gain is numerically equal to the cutoff frequency in the bode diagram. As shown in FIG. 4, to satisfy the requirement for adequate phase margin (larger than 30 degrees) and gain margin (larger than 8 dB), the best choice of the cutoff frequency is 0.5 to 1.0 times the first overturn frequency in high frequency range. Here, the cutoff frequency is the cutoff frequency of the inner speed loop and is numerically equal to the gain in the speed loop since the speed loop is also a type-i servo system. Therefore, due to the bandwidth limit for the speed loop from the consideration of avoiding high frequency resonance, the condition in Equation (2) for continuous and smooth switching between the control modes strictly limits the increase of the gain in position loop, which in turn limits the system accuracy.

Structure of the Invention

Friction is a very complex phenomenon, and it is difficult to obtain a mathematical model to completely describe the behavior of friction. However, friction has some advantageous properties which can be explored for controller design to compensate for the influence of friction on a servo system.

Figure 5:
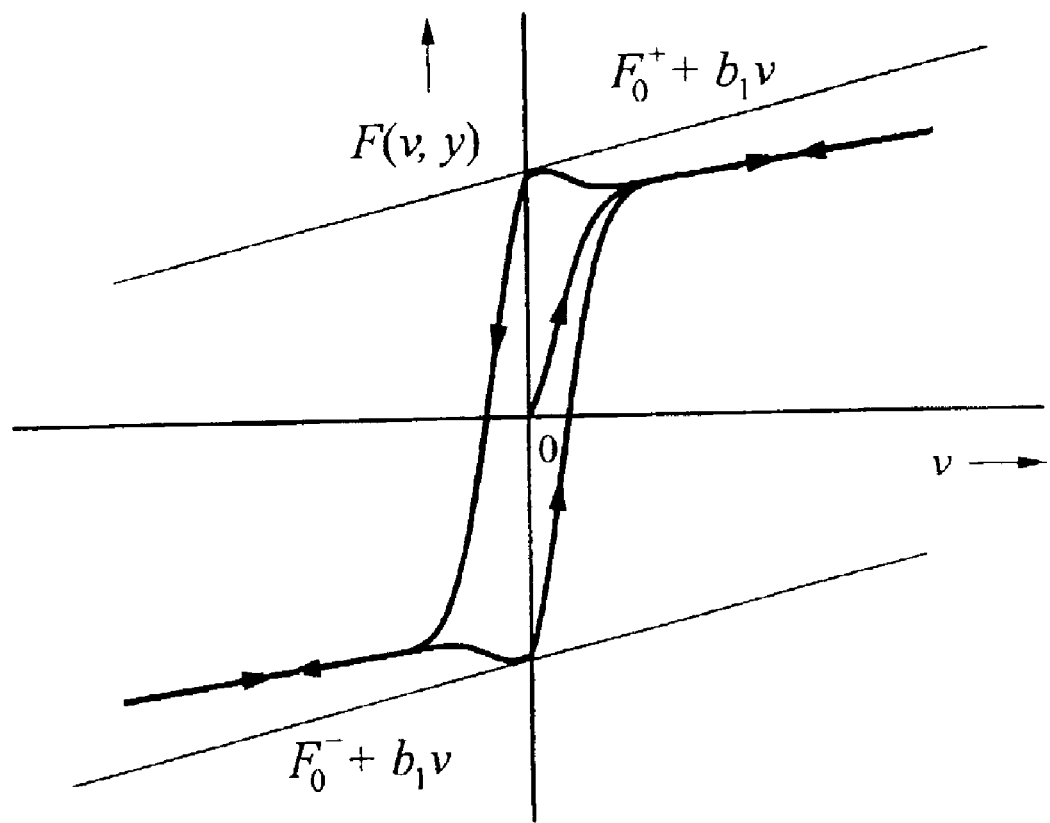
FIG. 5 illustrates the dynamic friction with respect to velocity and position, and illustrates boundedness of the dynamic friction.

Friction dissipates energy, and friction is bounded as shown in FIG. 5, which can be described mathematically as:

$$\begin{cases} |F(v, y)| \leq F_c, \\ F_c = \max(|F_c^+|, |F_c^-|), \\ F_c^- = F_0^- + b_1 v, \\ F_c^+ = F_0^+ + b_2 v \end{cases} \quad (7)$$

In Equation (7), $F_0^+=F(y,v)|_{v=0}^+$ and $F_0^-=F(y,v)|_{v=0}^-$. Therefore the steady state error due to friction is also bounded.

Figure 6:
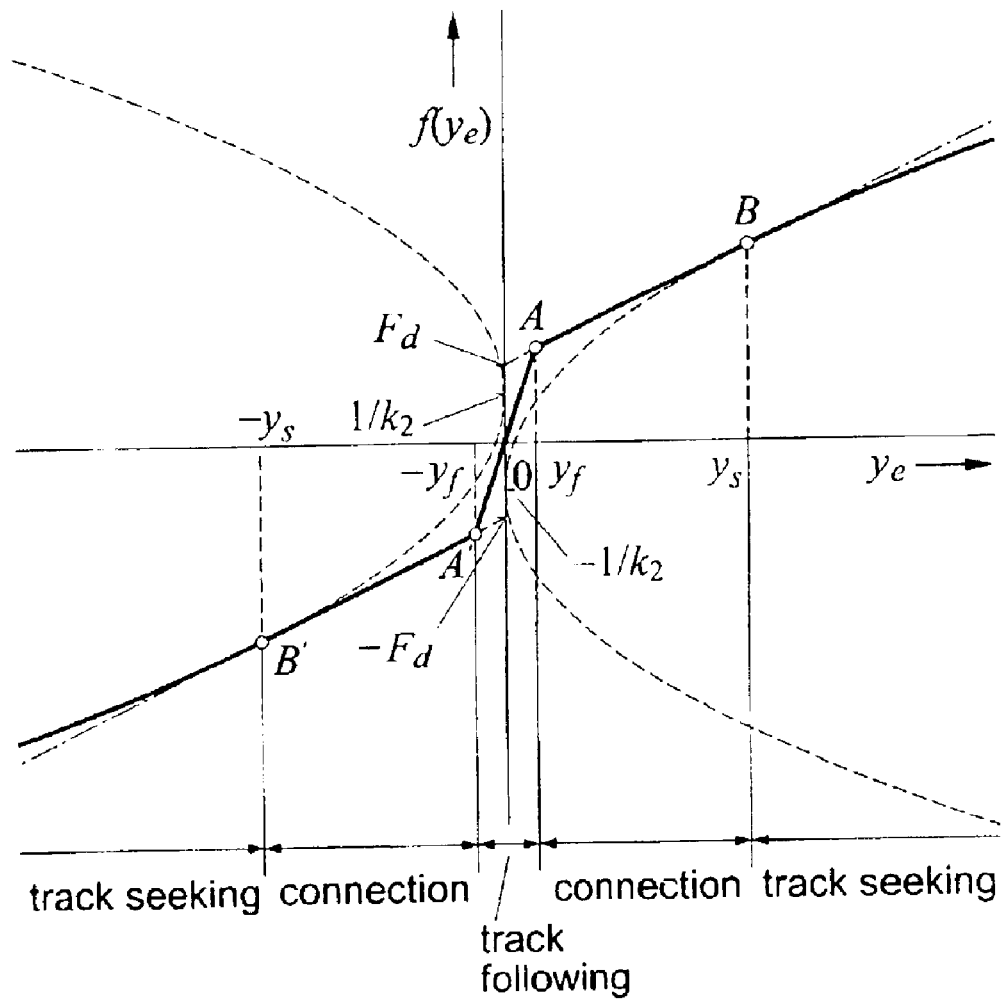
FIG. 6 illustrates a graphical representation of the triple modes of the present invention.

In view of the boundedness of friction and the restrictive limits for the gain in the position loop imposed by the condition in Equation (2) in PTOS control, the bondage of the condition in Equation (2) is broken by the present invention by introducing an extra mode for a triple-mode controller as shown in FIG. 6. The extra mode provides additional degree of freedom in controller design for both seeking and track following. Two thresholds are illustrated in FIG. 6. The first threshold is at position $y_s$. The second threshold is at a position $y_f$. When the error is larger than the first threshold $y_s$, i.e., when the controller is in the track seeking mode or the first mode, the proximate time optimal control is used to saturate to amplifier for fast seeking. When the error is smaller than the second threshold $y_f$, i.e., when the controller is in the track following mode or the third mode, a robust compensator with relatively high gain but small output amplitude is used to compensate for friction and other torque disturbances. When the error is in between the first threshold $y_s$ and the second threshold $y_f$, i.e., when the controller is in the second mode, a bridging control is introduced to guarantee the continuous transition between the proximate time optimal control for track seeking and the robust compensator for track following. The position loop gain is enlarged to compensate for friction and other torque disturbances without losing the continuous switching between the two modes for track seeking and track following. Note that $F_d$ in FIG. 6 is the magnitude of friction expressed in the position loop, and lies on the bridging straight line. From the parabola and the bridging straight line, a point B and the first threshold $y_s$, can be determined as indicated by the dash-dotted line. Once the gain in the third mode is determined for certain desired control performance, a point A and the second threshold $y_f$ are defined.

Figure 7:
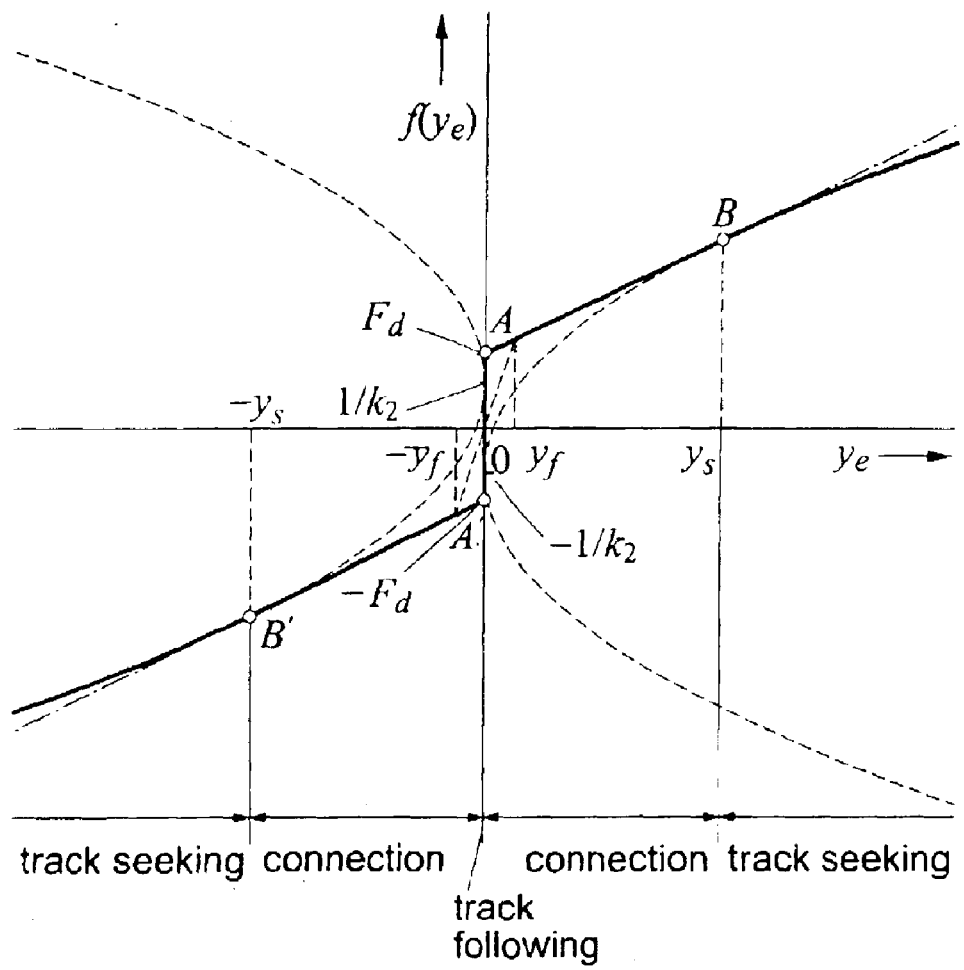
FIG. 7 illustrates a graphical representation of a first alternative version of the present invention wherein the third mode diminishes to a bang-bang controller at zero position error.
Figure 8:
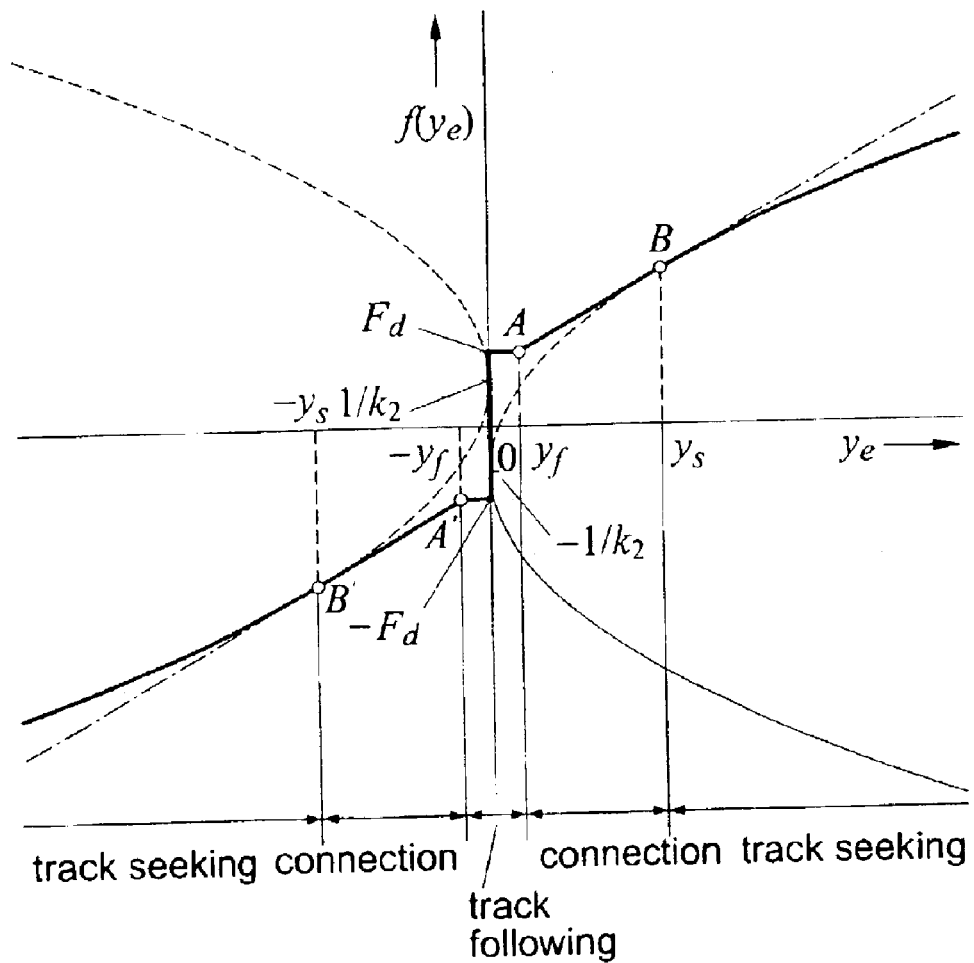
FIG. 8 illustrates a graphical representation of a second alternative version of the present invention wherein the third mode is a bang-bang controller with a constant output.

In actual implementation, there are several possible variations. If bang-bang control is permitted in practice during the track following mode, then the triple-mode controller has two variations (i.e., first and second alternative embodiments), as shown in FIG. 7 and FIG. 8, respectively. For the modified triple-mode controller shown in FIG. 7, the third mode simply diminishes. For the modified triple mode controller shown in FIG. 8, the magnitude of the bang-bang control in the third mode is larger by a small constant than that of friction to drive the possible residue error to zero. In the case of FIG. 8, the second threshold $y_f$ can be determined first according to certain tracking accuracy. Subsequently, the point A can be found. From the point A and the parabola, the point B can be found. Subsequently, the first threshold $y_s$ can be found.

Figure 9:
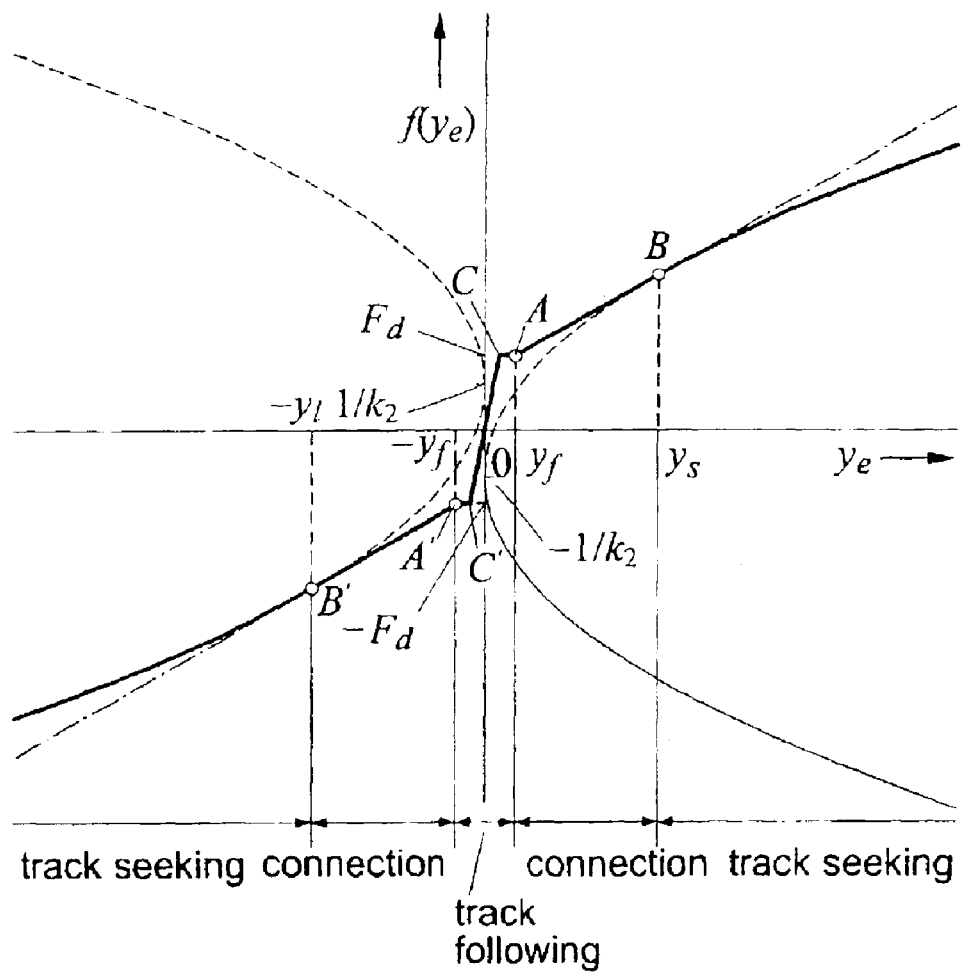
FIG. 9 illustrates a graphical representation of a third alternative version of the present invention wherein the bang-bang controller with a constant output of the second alternative embodiment of FIG. 8 is modified to include a high gain controller at the origin.
Figure 10:
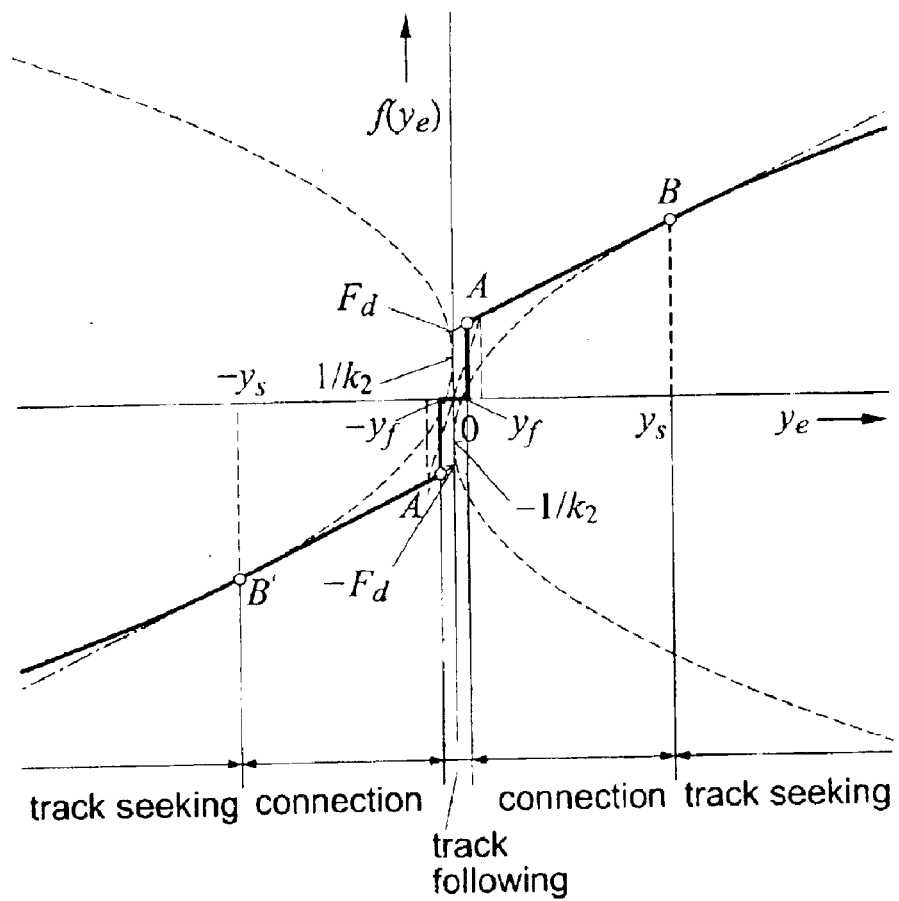
FIG. 10 illustrates a graphical representation of a fourth alternative embodiment of the present invention, where a dead-zone controller is introduced to remove chattering.

To remove the chattering from the control signals in the controllers shown in FIG. 7 and FIG. 8, two additional variations are shown in FIG. 9 and FIG. 10 for different considerations. The controller shown in FIG. 9 is an extension of the controller shown in FIG. 8 and uses high gain position feedback to replace the bang-bang control in order to remove control signal chattering. A point C in FIG. 9 can be determined from the points A and A' and from the slope of the compensator.

The controller shown in FIG. 10 is modified from FIG. 7. A small dead-zone is introduced as a compromise between system performance and the high frequency chattering of the control signal, where the width of dead-zone is subject to the required system accuracy.

Figure 11:
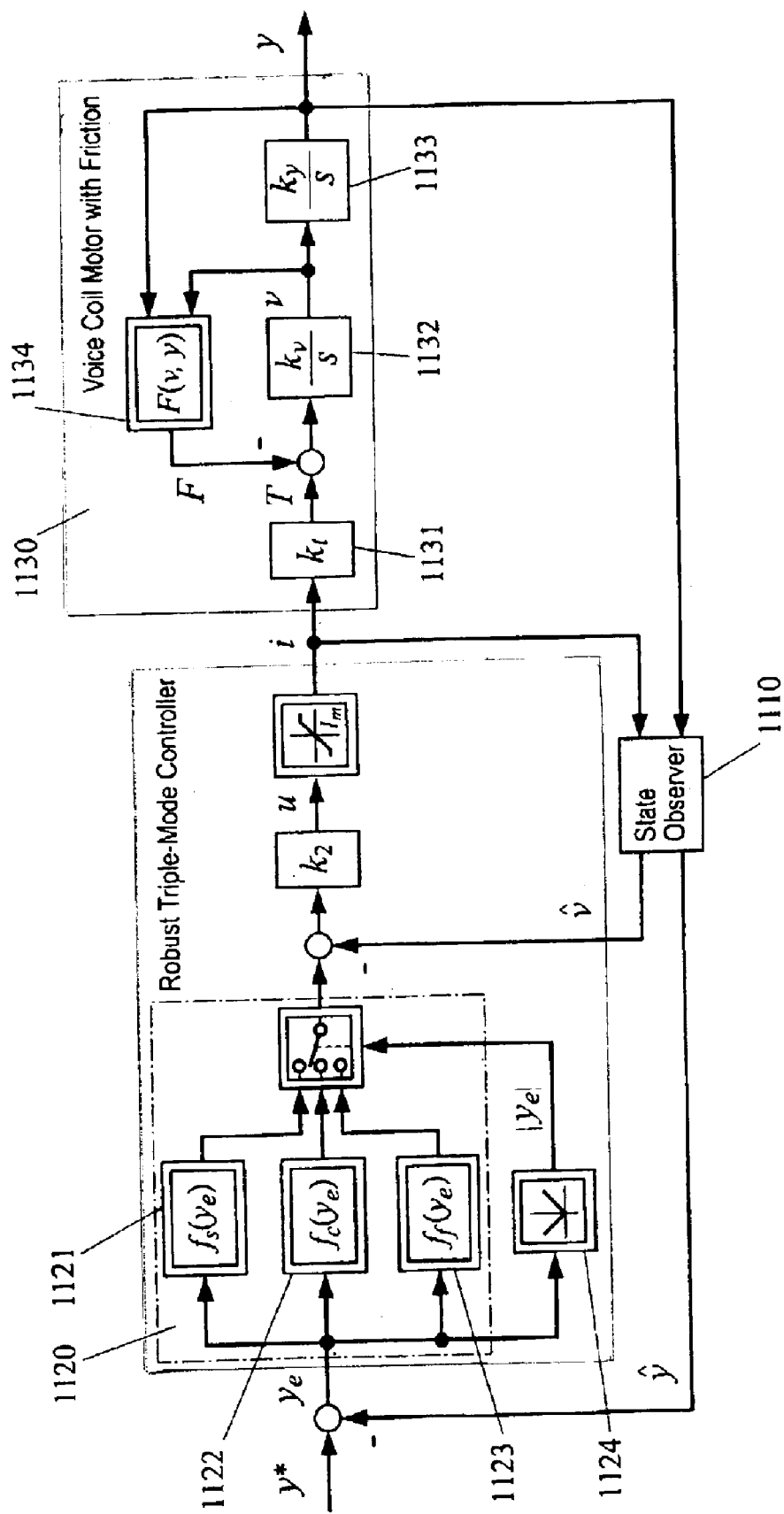
FIG. 11 schematically illustrates a block diagram of the preferred embodiment of the present invention.

An overall block diagram of a preferred embodiment of the invention is schematically illustrated in FIG. 11. A state observer 1110 generates the velocity signal $\hat{v}$ and the position signal $\hat{y}$ for a robust triple-mode controller 1120. In the controller 1120, the position controller $f(y_e)$ is switched among three control modes: (a) a first mode, Proximate Time Optimal Controller (PTOC) $f_s(y_e)$ 1121, which is designed as a time optimal controller for track seeking; (b) a second mode, robust compensator $f_f(y_e)$ 1123, which is designed for robust friction compensation for track following; and (c) a third mode, the bridge mode $f_c(y_e)$ 1122. The switching is controlled by the absolute value of the position error from an absolute value generator 1124. In the VCM 1130, the control current is transferred into torque through a torque constant $k_1$ 1131. The mechanical dynamics are described by a first integrator 1132 having a gain $k_v$ and a second integrator 1133 having a gain $k_y$. The system nonlinearity, represented by a block 1134, is assumed here as an example to be the pivot friction of a bearing, which is a function of both velocity and position.

The PTOC for track seeking is selected when the absolute value of position error is larger than threshold $y_s$ as follows:

$$f_s(y_e) = sgn(y_e)\left(\sqrt{\frac{2\alpha I_m k_i k_v}{k_y}|y_e|} - \frac{I_m}{k_2}\right), \text{ for } |y_e| > y_s \quad (8)$$

The bridge mode is a straight line of the position error $y_e$ with a bias $F_d$, as described by:

$$f_c(y_e) = \frac{k_1}{k_2}y_e + sgn(y_e)F_d, \text{ for } y_f < |y_e| \le y_s \quad (9)$$

In Equation (9), $F_d = F_c/(k_2 k_1) + \epsilon$, $F_c$ is the friction bound (i.e., maximum friction), and $\epsilon > 0$.

The robust compensator is defined as:

$$f_f(y_e) = k_f \frac{(\beta_1 \tau_1 s + 1)(\tau_2 s + 1)}{(\tau_1 s + 1)(\beta_2 \tau_2 s + 1)} y_e, \text{ for } |y_e| \le y_f \quad (10)$$

In Equation (10), for $0 < \beta_1 < 1$, $0 < \beta_2 < 1$, $\beta_1$ and $\beta_2$ are the parameters of the corresponding lag-lead compensator. For $0 < \tau_1 < 1$, $0 < \tau_2 < 1$, $\tau_1$ and $\tau_2$ are the time constants of the filters and $k_f$ is the gain of the robust compensator. The lag-lead filter is used here to improve system performance.

To guarantee continuous and smooth switching between control modes $f_s(y_e)$ and $f_f(y_e)$, gains $k_1$ and $k_2$ satisfy the following constraints:

$$2k_1 k_y (1 + F_d) = \alpha k_2^2 k_i k_v \quad (11)$$

$$y_l = \frac{I_m(1 + F_d)}{k_1} \quad (12)$$

Selection of the Parameters in the Invention

Practical implementation of the invention involves the determination of the necessary parameters below. The methods for selecting the parameters are not exclusive, and other methods can also be used.

Determination of Friction Bound $F_c$

The friction bound $F_c$ can be determined by a simple off-line identification procedure in which a linear position controller with a known gain $k_1/k_2$ and a linear speed controller with a known gain $k_2$ are used to drive the actuator, and the position error is measured.

The maximum position error $y_{cm}$ can be used to determine the bound of friction as follows:

$$F_c = y_{cm} k_1 k_1 \quad (13)$$

Determination of the Gain $k_2$ in the Speed Loop

The gain $k_2$ in the speed feedback loop determines the system bandwidth. In the design of speed feedback loop, the gain $k_2$ should be chosen such that the cutoff frequency of the open-loop frequency characteristics is ⅕ to ½ of the lowest system resonance frequency to ensure enough phase margin (larger than 30 degrees) and gain margin (larger than 8 dB) as shown in FIG. 4.

Determination of $k_1$, $y_l$ and $f_l(y_e)$

Once $F_c$ is fixed, $k_1$, $y_1$ and $f_l(y_e)$ can be obtained from the Equations (8), (10) and (11).

Determination of Gain $k_f$ of the Robust Compensator

Figure 12A:
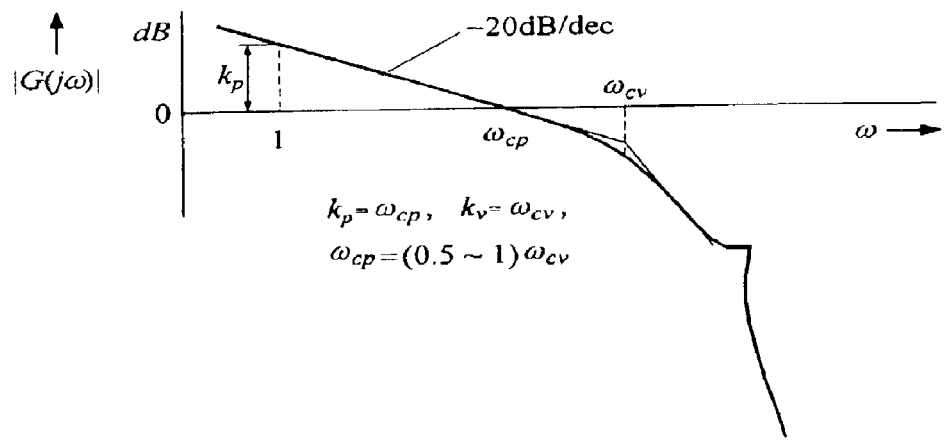
FIG. 12(a) is a graph of gain versus frequency that illustrates the design principle of the position feedback loop.

In the design of the outer position loop, the well designed speed feedback loop can be approximated as a first-order delay element with the equivalent time constant being the inverse of the cutoff frequency of the speed feedback loop. (See, for example, W. Leonhard, *Einführung in die Regelungstechnik*, 4th Ed., Friedr. Vieweg & Sohn Verlagsgesellschaft mbH, Braunschweig 1987. (in German), (*Introduction to Control Engineering and Linear Control Systems*, Translated by T. Rajagopalan and D. V R. L. Rao., Berlin, Springer, 1976). Thus, the open loop frequency response of the outer position loop is shown in FIG. 12(a). Since the bandwidth is fixed, the maximum gain of the position loop is:

$$k_f = \frac{k_2 k_v}{k_y} \qquad (14)$$

Figure 12B:
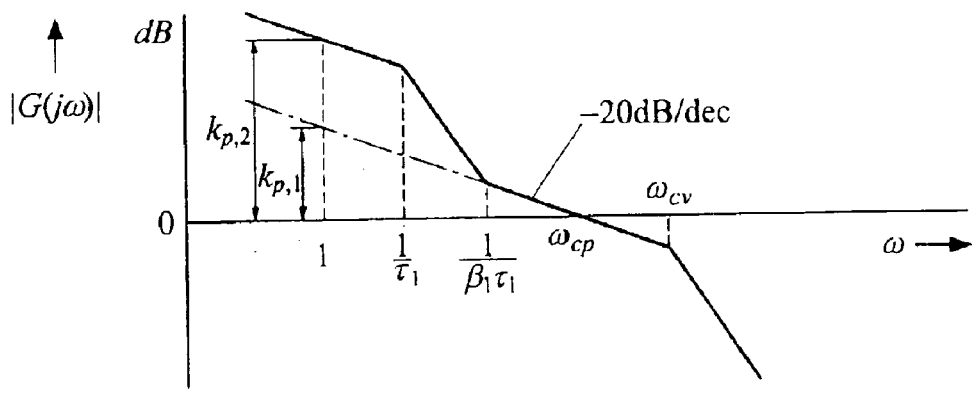
FIG. 12(b) is a graph of gain versus frequency that illustrates the open-loop frequency response of the position feedback loop with a phase-lag compensator to increase the gain in the low frequency range.

If this gain cannot satisfy the requirement for system accuracy, a phase-lag filter can be used to increase the gain in the low frequency range while maintaining the same system bandwidth as shown in FIG. 12(b). However, to avoid the limit cycle likely caused, the integral action should be stopped in the range below 100 Hz or so where the dynamic friction is effective. That is:

$$\frac{1}{\beta_1 r_1} \geq 200\pi \qquad (15)$$

In the case that the system accuracy requirement is satisfied, but the dynamic performance is not desirable as represented by unacceptable phase and gain margins, a phase-lead filter can be used to increase the phase margin so as to improve the system dynamic performance. Thus, the whole compensator in the position feedback loop is actually a lag-lead compensator, as represented by Equation (10).

Technical Advantages of the Present Invention

The present invention uses the boundedness of friction and the high gain of the robust compensator to compensate for friction in the case that the system bandwidth is limited in the high frequency range due to the flexibility of the actuator arm. By breaking the constraint to the gains in velocity and position loops, the design of the system bandwidth and the system accuracy are broken into two design stages: a first stage designs the velocity feedback loop, and a second stage designs the position feedback loop. In the first stage, the velocity feedback loop is designed according to the system bandwidth limited by the resonance frequency in the high frequency range due to structural flexibility. In the second stage, the position feedback loop is designed to satisfy the requirement for system accuracy by changing the shape of the frequency response through a lead-lag compensator in the case that the system bandwidth is fixed.

Figure 13:
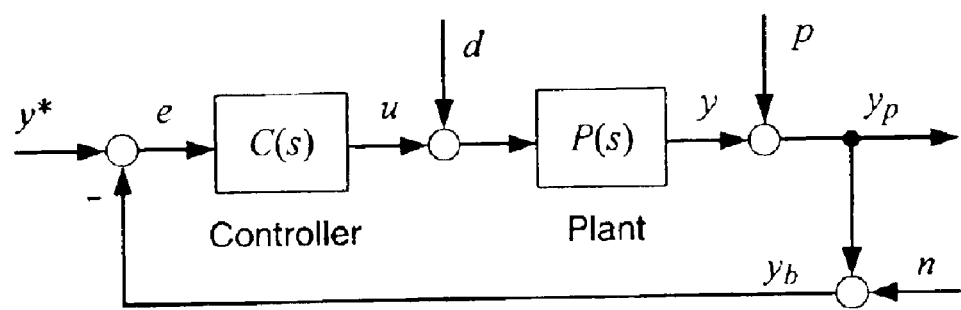
FIG. 13 is a block diagram that illustrates the disturbances signals causing tracking errors in a hard disk drive.

The invention is not limited to friction compensation but can also be used for compensation of other torque disturbances with small amplitude within the system bandwidth. As shown in FIG. 13, the torque disturbances denoted by d includes friction, windage, torque due to flex cable, shock and vibrations. Most of these mechanical disturbances are within the system bandwidth. In FIG. 13, p refers to the disturbances in the form of displacement, such as spindle motor vibrations and disk flutter, and n stands for the electrical noise in sensing displacement. As long as the amplitude of the maximum system error is detected, the amplitude of the robust compensator $F_d$ can be determined. Therefore, the robust compensator can be used to attenuate the influence of disturbances.

Although the switching from the track seeking mode to the bridging mode is continuous and smooth, the switching from the bridging mode to the track following mode is only continuous but not smooth. Because the second switching occurs at the moment when system error is much smaller than the first switching, the influence to the system performance due to the non-smoothness of the second switching is quite small. Furthermore, if necessary, the initial value compensation method (such as the one presented in T. Yamaguchi, K. Shishida, S. Tohyama, and H. Hirai, *Mode switching control design with initial value compensation and its application to head positioning control on magnetic disk drives*, IEEE Transactions on Industrial Electronics, Vol. 43, No. 1, February 1996, pages 65–73) can be used to optimize the switching to improve the transient performance of the second switching.

Simulation Results of the Preferred Embodiment

Numerical simulations based on a FUJITSU hard disk drive were carried out to verify the effectiveness of the invention. In the simulation, the internal system nonlinearity is represented by pivot friction of the bearing with the bristle friction model as proposed in C. Canudas de Wit, et al., *A new model for control of systems with friction*, cited above.

The bristle friction model captures most of the friction behaviors and is mathematically represented as:

$$\begin{cases} F = \sigma_0 z + \sigma_1 \frac{dz}{dt} + \sigma_2 v, \\ \frac{dz}{dt} = -\frac{|v|}{g(v)} z = v, \\ \sigma_0 g(v) = F_C + (F_S - F_C) e^{-(v/v_s)^2} \end{cases} \qquad (16)$$

In Equation (16), z(t) describes the average deflection of the bristles, and g(v) is a positive function depending on many factors such as material properties, lubrication and temperature. The factors $\sigma_0$, $\sigma_1$ and $\sigma_2$ are stiffness, damping and viscous friction coefficients, respectively. The factor v, is the Stribeck velocity. The value $F_c$ is the Coulomb friction level. The value $F_s$ is the level of stiction (i.e., static friction).

Figure 14A:
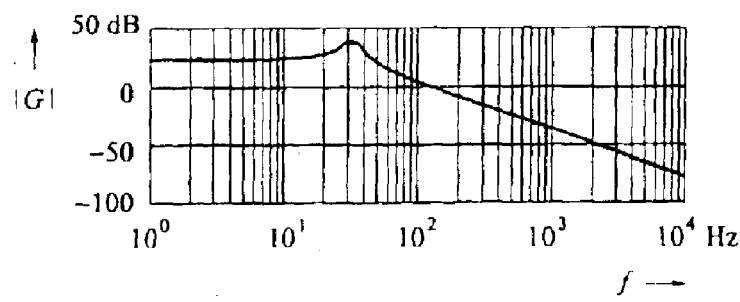
FIG. 14(a) illustrates gain decrease in low frequency range.
Figure 14B:
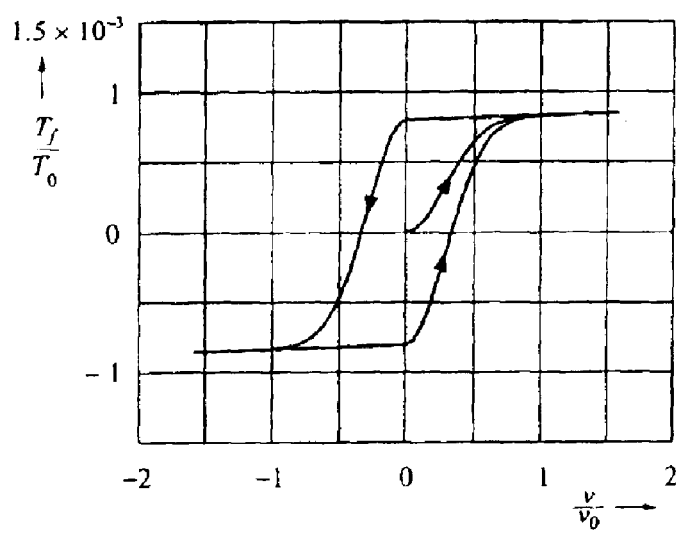
FIG. 14(b) illustrates normalized friction torque to position.
Figure 14C:
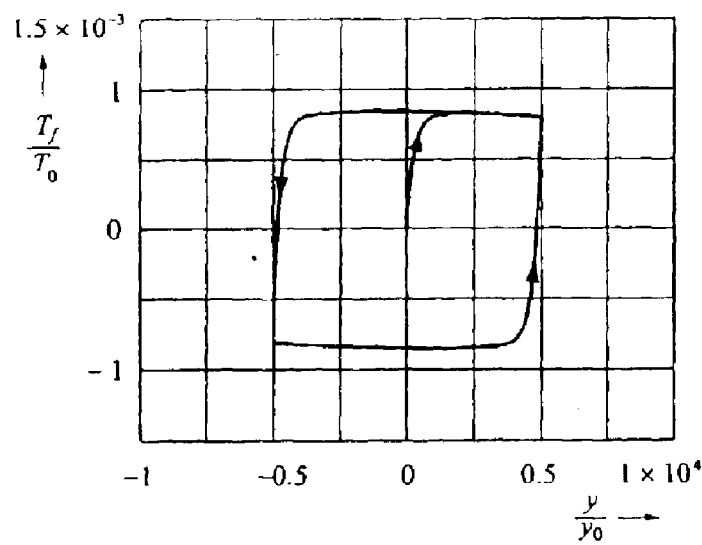
FIG. 14(c) illustrates normalized friction torque to velocity.
Figure 15A:
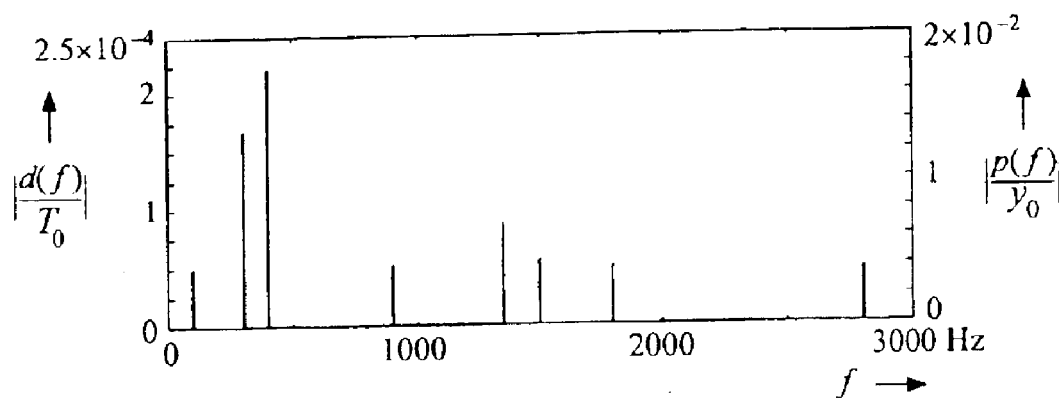
FIG. 15(a) illustrates a power spectrum of the normalized disturbance signals.
Figure 15B:
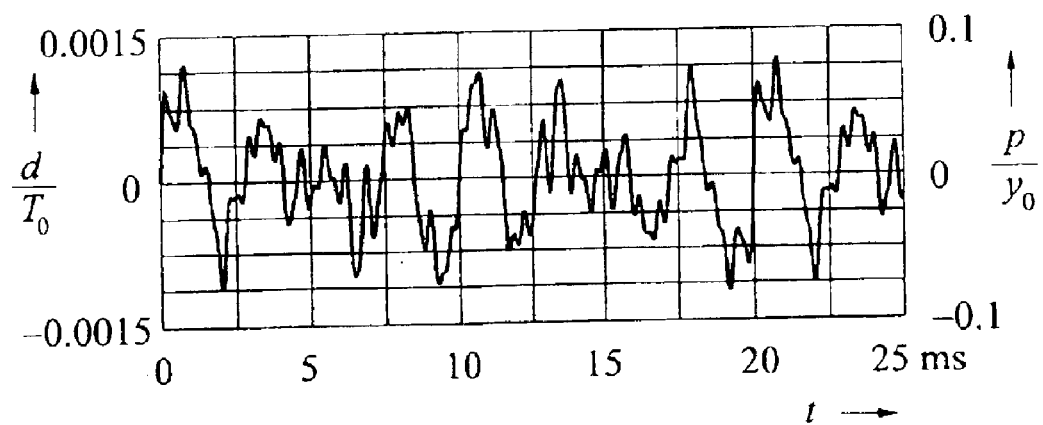
FIG. 15(b) illustrates a time history of the normalized disturbance signals.

FIG. 14(a) illustrates the decrease of system gain in the low-frequency range due to friction. The dynamic behaviors of friction are illustrated in FIG. 14(b) as the characteristics of friction with respect to velocity, and are illustrated in FIG. 14(c) as the characteristics of friction with respect to position. FIGS. 15(a) and 15(b) illustrate the torque and position disturbance signals used in the simulation, in which the nominal position is chosen as one track, $y_0=1$ μm, and the nominal torque is set to be the maximum torque, $T_0=0.0624$ Newton-meters.

In the discrete simulation, the sampling time is chosen as 100 μs. The actuator arm flexibility is considered as a second order resonance model in the high frequency range of 3000 Hz with a damping factor of 0.08. Simulation results show that a $k_2$ leading to speed feedback loop bandwidth of 1300 s$^{-1}$ with a phase margin of 89 degrees and a gain margin 8.6 dB can be selected to guarantee that no resonance is excited. The position loop that includes the robust compensator has a phase margin of 64.5 degree, a gain margin of 27.9 dB, and a bandwidth of about 1296 s$^{-1}$. For the friction compensator having a lag-lead filter, the parameters are chosen as $\tau_1=0.75$ milliseconds, $\beta_1=0.06$ and $\tau_2=10$ milliseconds, $\beta_2=0.1$.

Figure 16A:
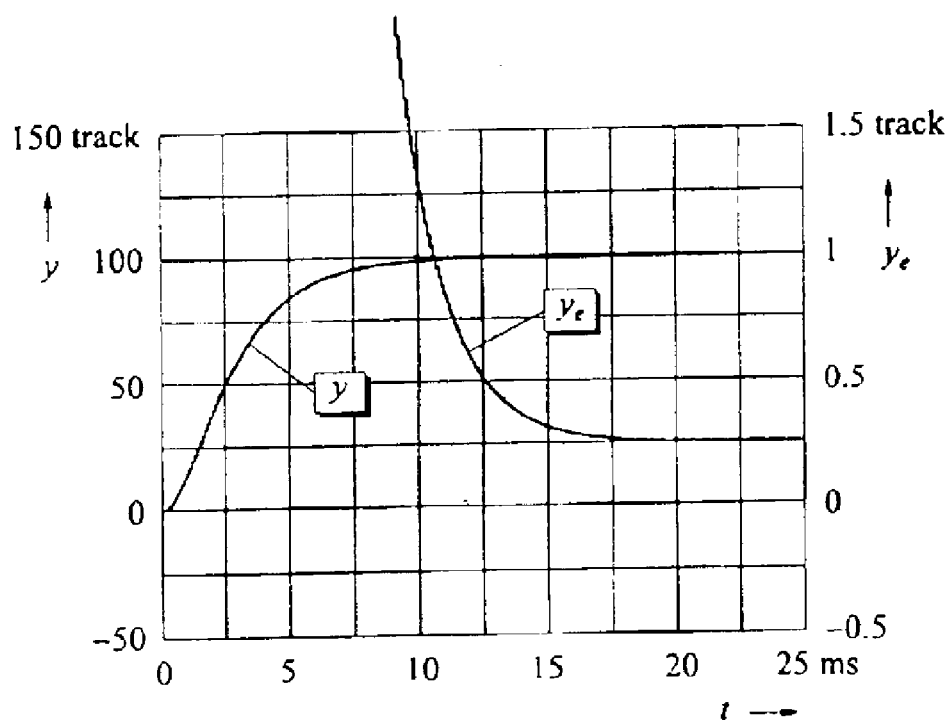
FIG. 16 (comprising FIGS. 16(a) and 16(b)) illustrates the closed-loop performance and the steady state error of the PTOS scheme.
Figure 16B:
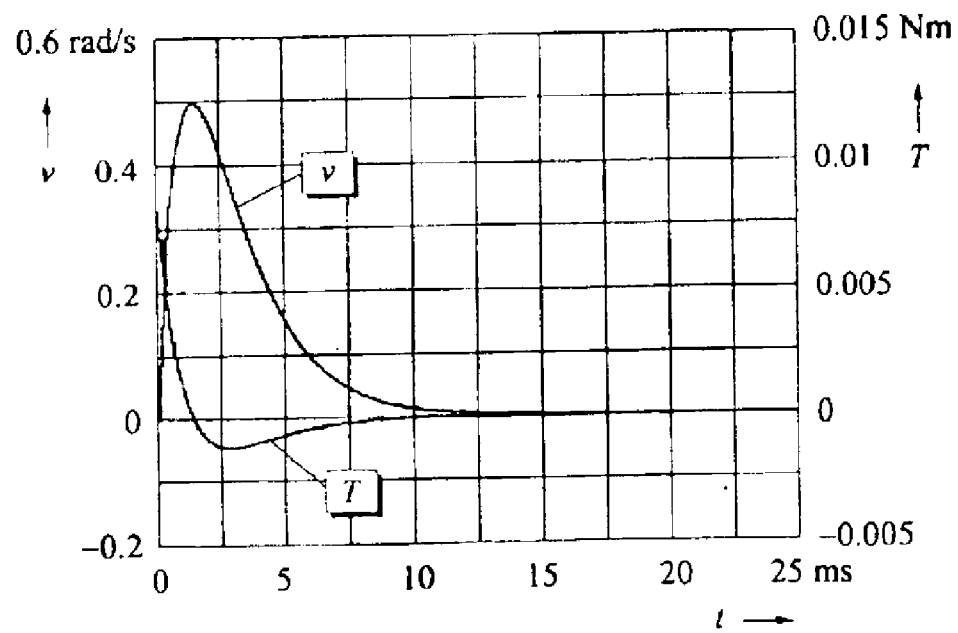
Figure 17A:
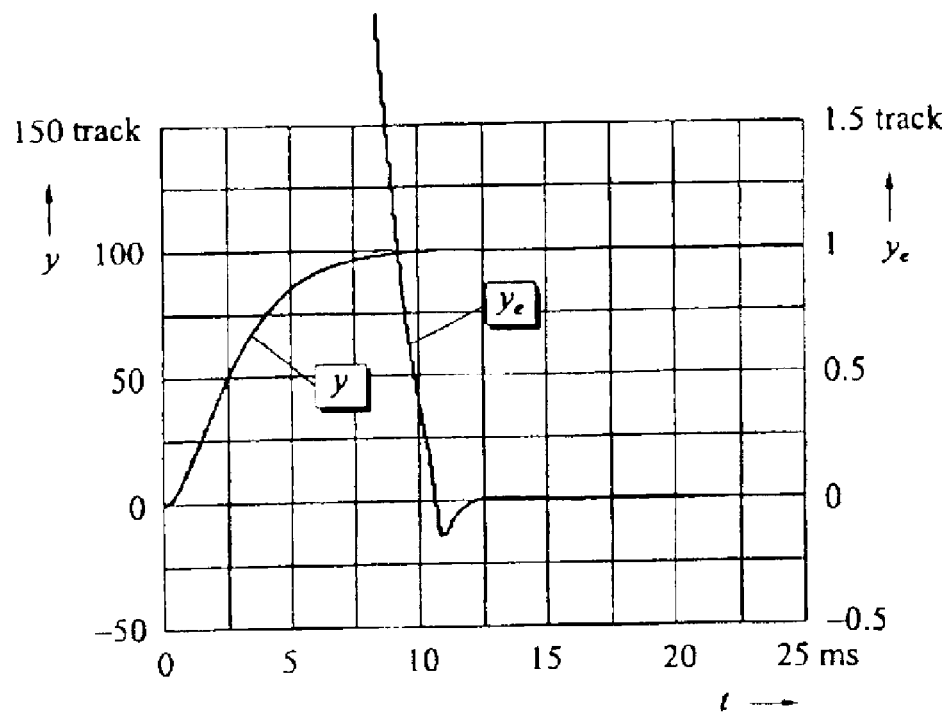
FIG. 17 (comprising FIGS. 17(a) and 17(b)) illustrates the closed-loop performance and the steady state error of the present invention.
Figure 17B:
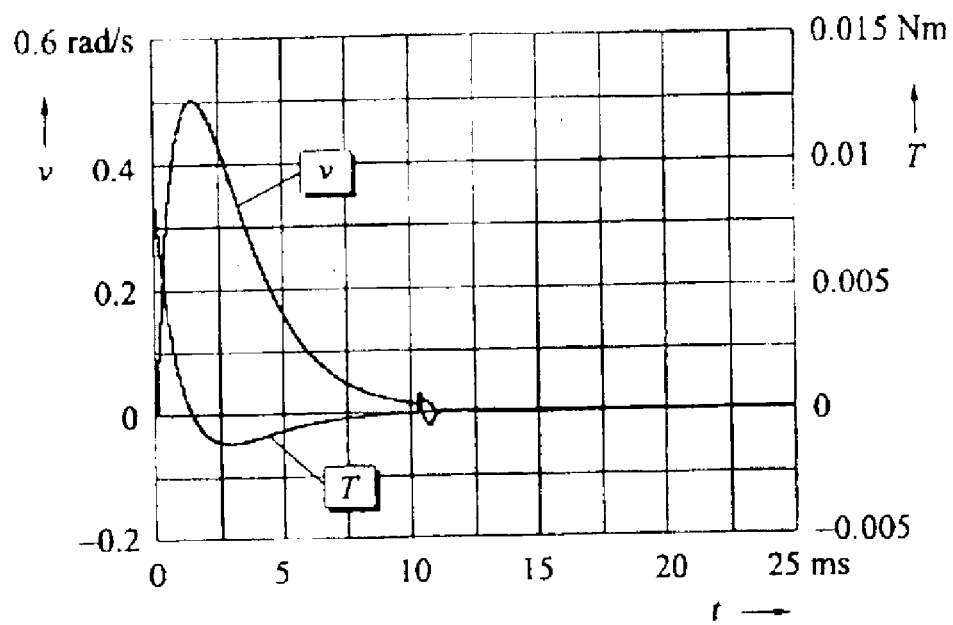

In the simulations, one track is assumed to be 1 μm, and a step change of 100 tracks is conducted. For the conventional PFOS, FIG. 16(a) presents the step responses of position and position error, and FIG. 16(b) presents the step responses of velocity and control torque. There exists a steady state position error of about 0.25 track due to friction, i.e., approximately 250 nanometers. The improved dynamic responses due to this invention are shown in FIGS. 17(a) and 17(b), where the steady state position error $y_e$ is compensated for almost to zero, and the overshoot is less than 0.2 track (i.e., less than approximately 200 nanometers).

Figure 18A:
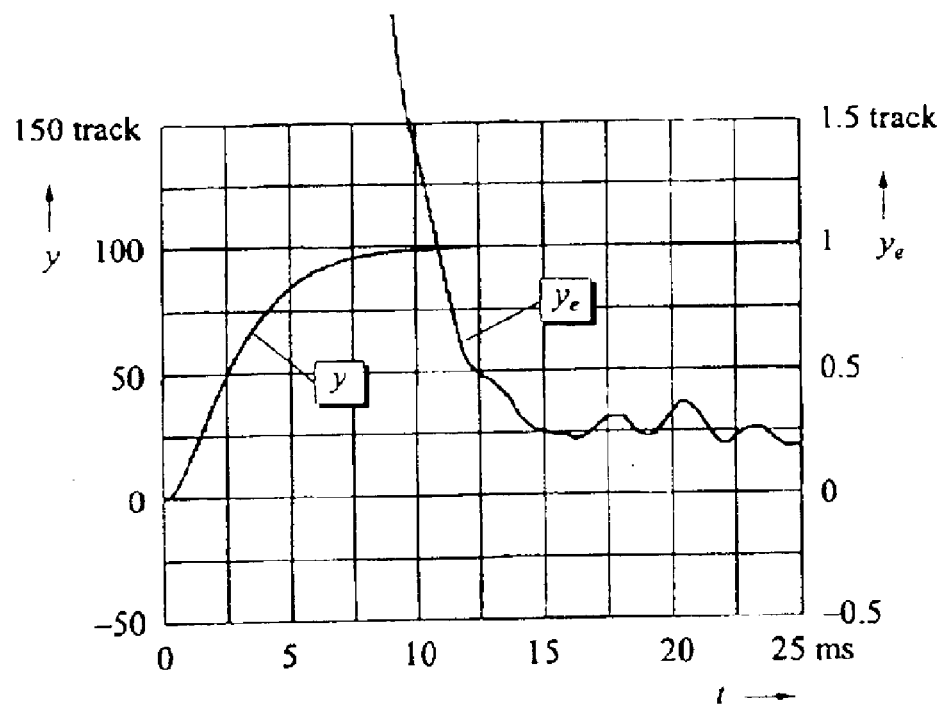
FIG. 18 (comprising FIGS. 18(a) and 18(b)) illustrates the dynamic behavior of the system with torque disturbance when PTOS is used.
Figure 18B:
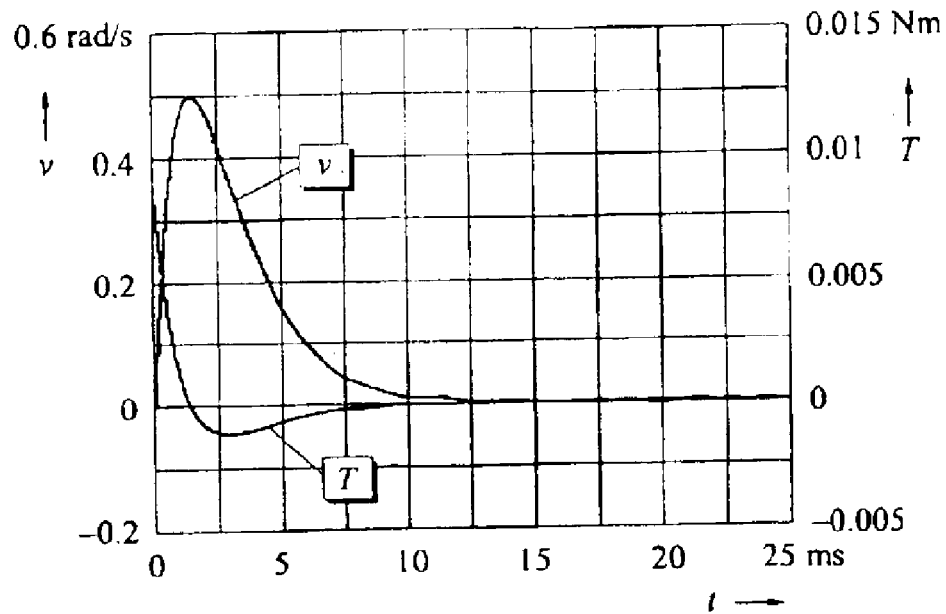

FIGS. 18(a) and 18(b) present the dynamic behavior of the system with torque disturbance when PTOS is used. The less tracking error due to the disturbance can be observed clearly.

Figure 19A:
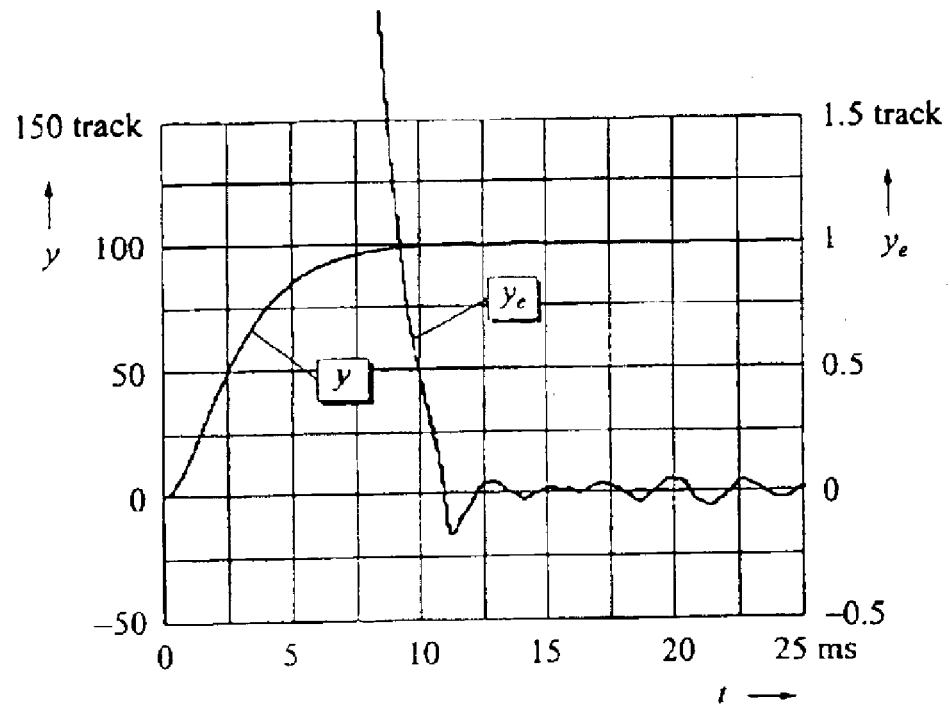
FIG. 19 (comprising FIGS. 19(a) and 19(b)) illustrates the improved dynamic behavior of the system with torque disturbance when the present invention is used.
Figure 19B:
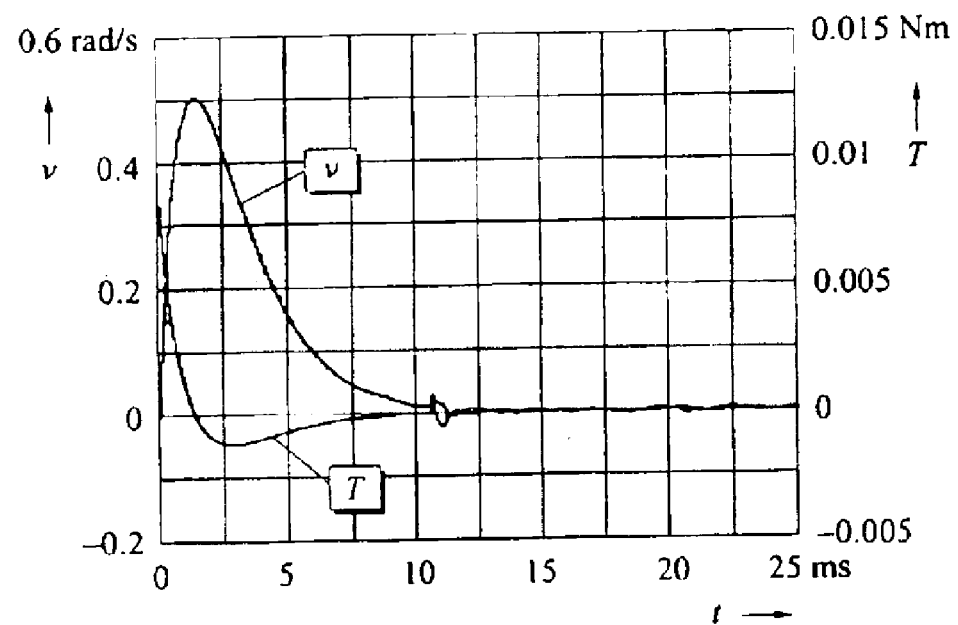

FIGS. 19(a) and 19(b) illustrate the improved dynamic behaviors of the system with torque disturbance when the present invention is used.

Figure 20A:
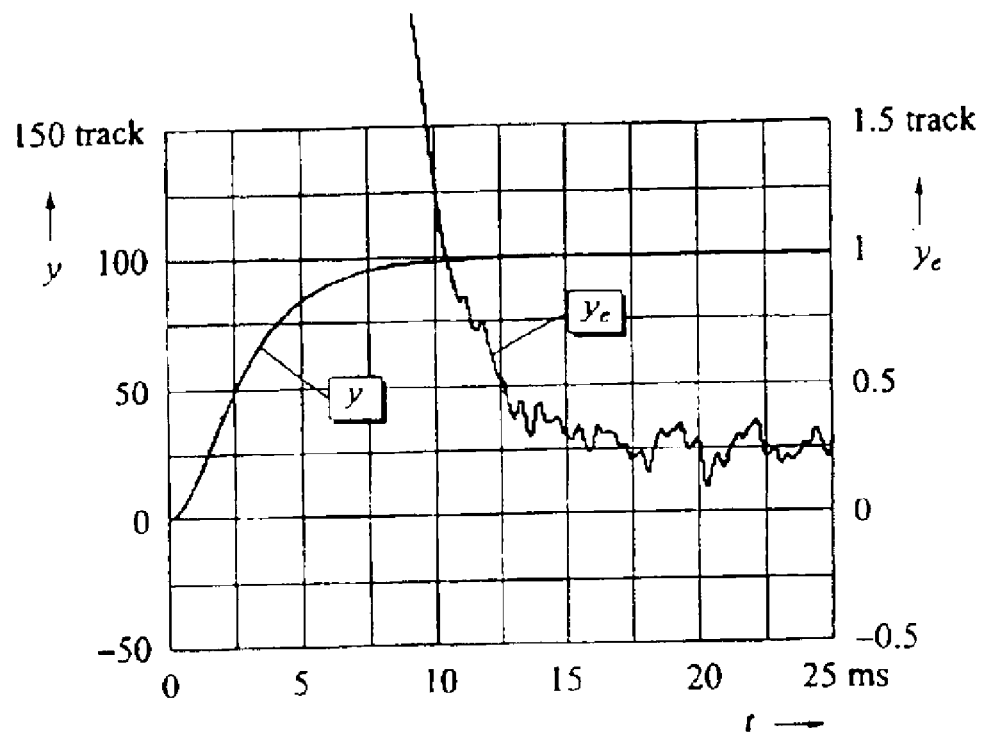
FIG. 20 (comprising FIGS. 20(a) and 20(b)) illustrates the dynamic behavior of the system with position disturbance when PTOS is used.
Figure 20B:
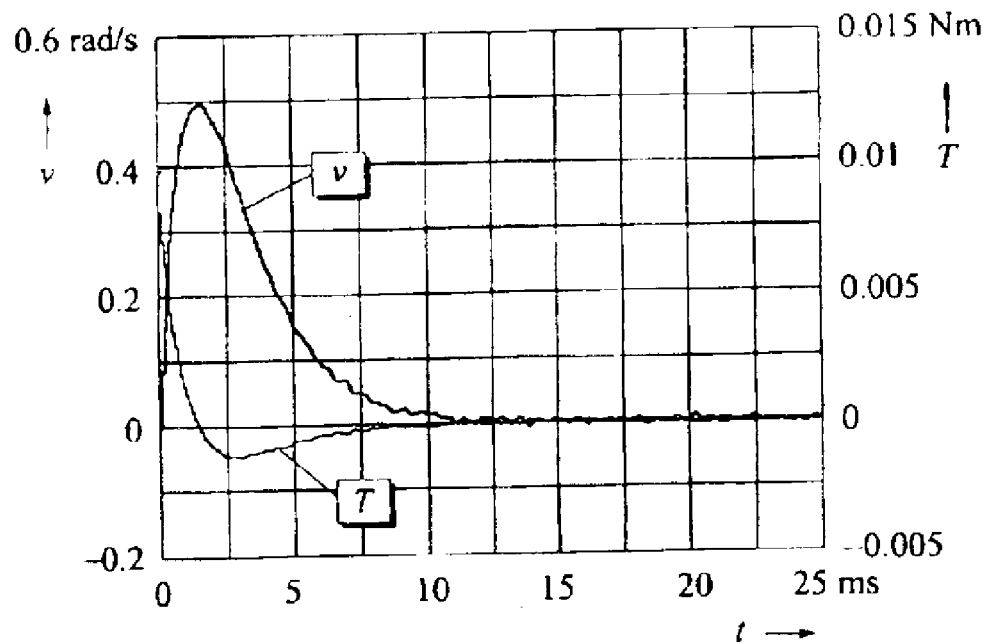

FIGS. 20(a) and 20(b) illustrate the dynamic behavior of the system with position disturbance when PTOS is used. It can be seen that the resulted tracking error has much more high frequency components.

Figure 21A:
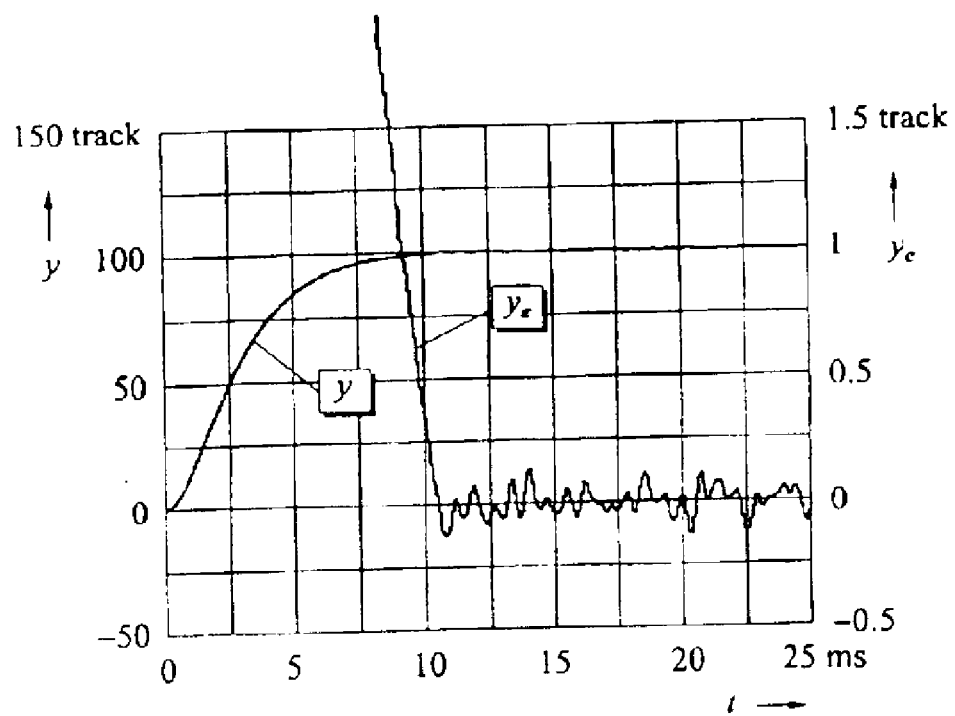
FIG. 21 (comprising FIGS. 21(a) and 21(b)) illustrates the improved dynamic behavior of the system with position disturbance when the present invention is used.
Figure 21B:
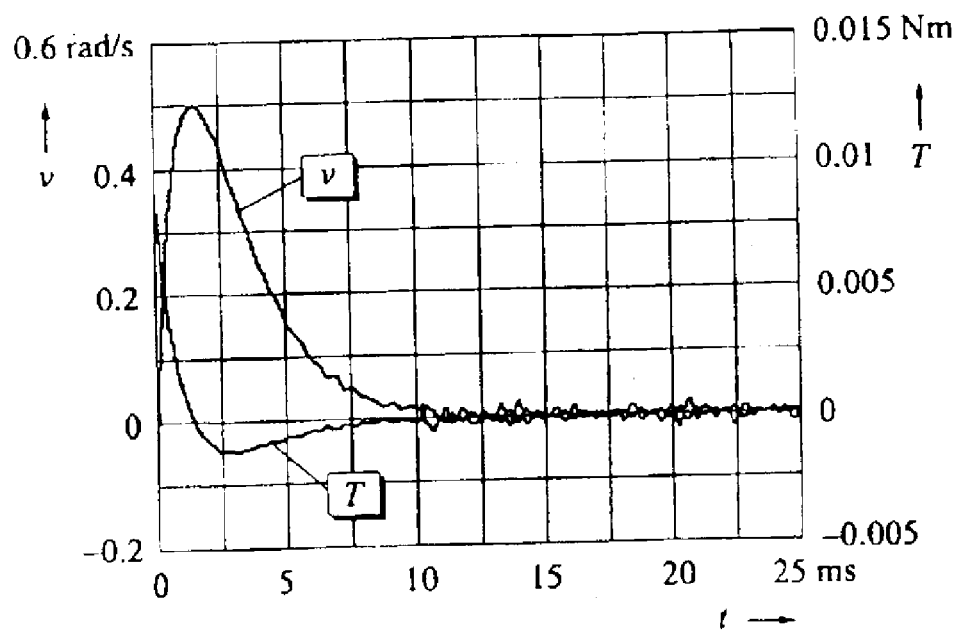

FIGS. 21(a) and 21(b) illustrate the improved dynamic behavior of the system with position disturbance when the present invention is used.

Figure 22A:
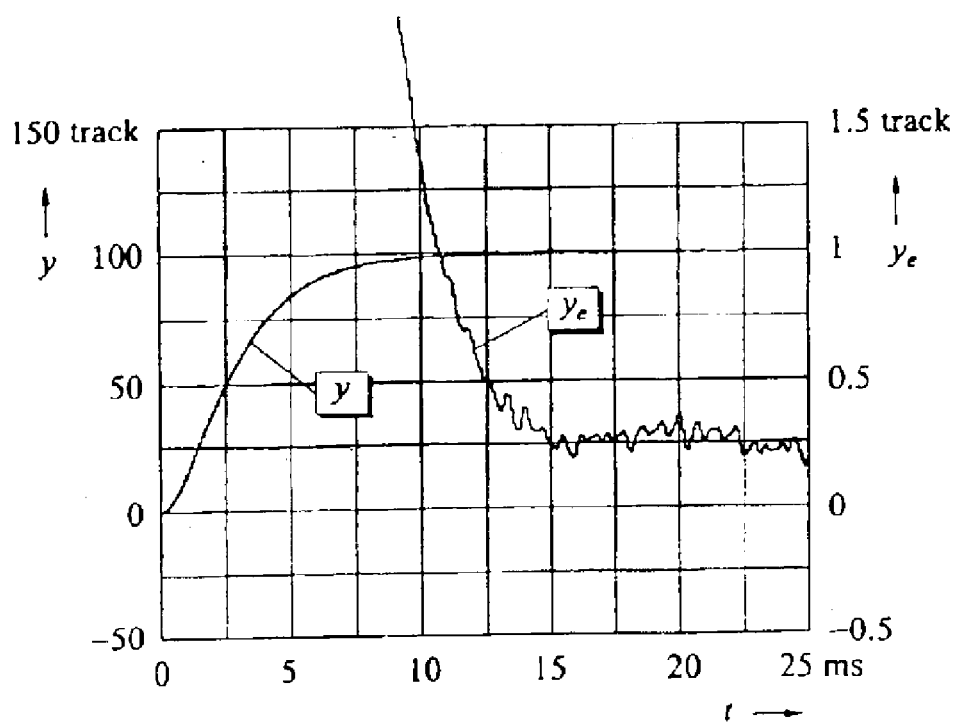
FIG. 22 (comprising FIGS. 22(a) and 22(b)) illustrates the dynamic behavior of the system with both torque and position disturbances when PTOS is used.
Figure 22B:
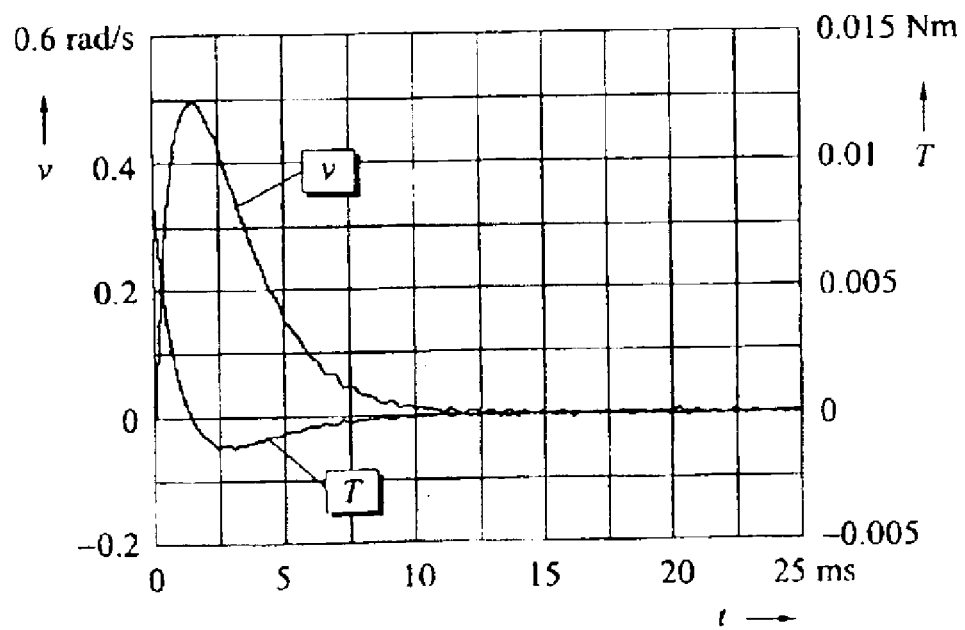

FIGS. 22(a) and 22(b) illustrate the dynamic behavior of the system with both torque and position disturbances when PTOS is used.

Figure 23A:
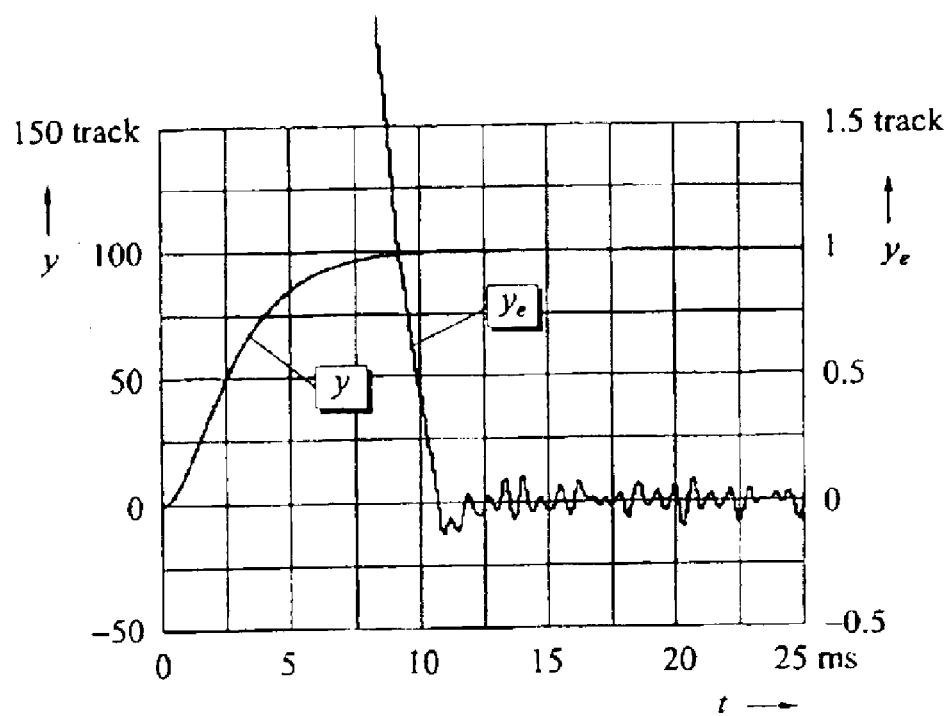
FIG. 23 (comprising FIGS. 23(a) and 23(b)) illustrates the improved dynamic behavior of the system with both torque and position disturbances when the present invention is used.
Figure 23B:
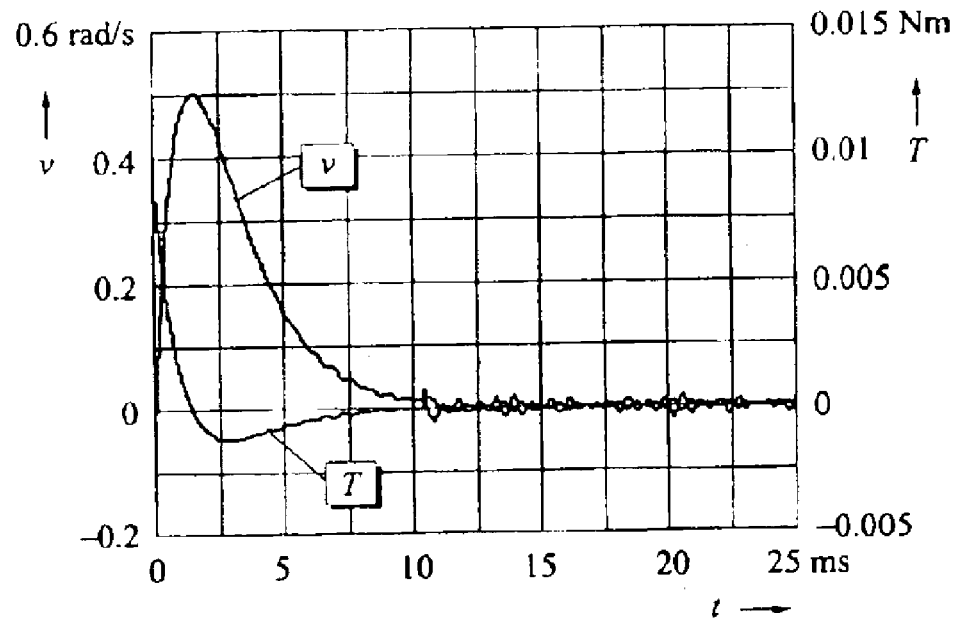

FIGS. 23(a) and 23(b) illustrate the improved dynamic behavior of the system with both torque and position disturbances when the present invention is used.

The forgoing description of the preferred embodiment of the invention has been presented for the purpose of illustration and description. It is not intended to be exhaustive or to limit the invention to the precise form disclosed. Many modifications and variations are possible in the light of foregoing teaching. It is intended that the scope of the invention be limited not by the above detailed description of the preferred embodiment of the invention, but rather by the claims appended hereto.

What is claimed is:

1. A method to control a disk drive having a head for reading or writing data from a disk, a moveable actuator motor to provide output torque for positioning the head relative to a pre-selecte data track on the disk, and a disk drive servo system that provides a command signal to the actuator motor, the disk drive servo system including a head position signal generator responsive to the position of the head and a position controller that generates the command signal to the actuator motor to move the head to a desired position, the method comprising:

operating the position controller as a proximate time-optimal controller (PTOC) during a track seeking mode to rapidly move the head to a selected track;

operating the position controller as a robust compensator during a track following mode to compensate for torque disturbances wherein the robust compensator includes a lead compensator, a lag compensator, or a lag-lead compensator; and operating the position controller in a continuous bridge mode when transitioning from the track seeking mode to the track following mode to provide continuity of the command signals to the actuator motor when transitioning from the track seeking mode.

2. The method to control a disk drive according to claim 1, wherein the position signal generator and the position controller form a position loop, and wherein the act of operating the position controller as a robust compensator comprises:

determining the bandwidth of the torque disturbances; and selecting one of the lead compensator, the lag compensator, or the lag-lead compensator to change the shape of the frequency response of the position loop.

3. The method to control a disk drive according to claim 1, further comprising:

determining a position error;
   operating the position controller in the track seeking mode when the position error has a magnitude greater than a selected first threshold;
   operating the position controller in the track following mode when the position error has a magnitude less than or equal to a selected second threshold; and
   operating the position controller in the bridge mode when the position error has a magnitude between the first threshold and the second threshold.

4. The method to control a disk drive according to claim 3, wherein:

the position controller implements a nonlinear function of the position error in the track seeking mode; and
   the position controller implements a linear function of the position error in the bridge mode, the linear function having its value and its first derivative at the first threshold equal to the value and the first derivative of the nonlinear function at the first threshold respectively.

5. A servo control system incorporated in a disk drive assembly having a head for reading or writing data from a disk, moveable actuator motor to provide output torque for positioning the head relative to a pre-selected data track on the disk, and a disk drive servo system that provides a command signal to the actuator motor, the disk drive servo system including a head position signal generator that generate a head position signal responsive to the position of the head, a head position controller that generates the command signal, and a state observer responsive to the command signal and to the head position signal to provide observed position and velocity signals, the servo control system comprising:

a proximate time-optimal controller (PTOC) operating in a first mode for track seeking to rapidly move the head to a desired track;

a robust compensator operating in a second mode for track following, the robust compensator including compensation for nonlinear torque disturbances; wherein the robust compensator comprises one of a lead compensator, a lag compensator or a lap-lead compensator; and a continuous bridge operating in a third mode between the first mode and the second mode to provide a continuous transition from the first mode to the second mode.

6. The servo control system according to claim 5, wherein the head position controller, the head position signal generator and the state observer comprise a position loop.

7. The servo control system according to claim 5, wherein said servo control system determines a position error from an observed position and a desired position, and wherein:

the PTOC is active in the first mode when the position error has a magnitude greater than a selected first threshold;
   the robust compensator is active in the second mode when the position error has a magnitude less than or equal to a selected second threshold; and the continuous bridge is active in the third mode when the position error has a magnitude between the first threshold and the second threshold.

8. The method to control a disk drive according to claim 7, wherein:
the PTOC implements a nonlinear function of the position error; and
the continuous bridge implements a linear function of the position error, the linear function having its value and its first derivative at the first threshold equal to the value and the first derivative of the nonlinear function at the first threshold respectively.

9. A multiple-mode controller for positioning the head of a disk drive assembly with respect to the tracks of a rotating disk, the controller comprising:
means for operating the controller in a proximate time-optimal controller (PTOC) mode to rapidly move the head to a desired track;
means for operating the controller as at least one of a lead compensator, a lag compensator, or a lag-lead compensator in a robust compensator mode to follow the desired track, said means including means for compensating for nonlinear torque disturbances; and
means for operating the controller in a continuous bridge mode to transition the controller from the PTOC mode to the robust compensator mode.

10. The multiple-mode controller according to claim 9, wherein the controller is responsive to a position error signal to:
enable the means for operating the controller in the PTOC mode when the position error signal has a magnitude greater than a first threshold;
enable the means for operating the controller in the robust compensator mode when the position error signal has a magnitude less than or equal to a second threshold; and
enable the means for operating the controller in the continuous bridge mode when the position error signal has a magnitude between the first threshold and the second threshold.

11. The multiple mode controller according to claim 10, wherein:
the means for operating the controller in the PTOC mode implements a nonlinear function of the position error; and
the means for operating the controller in the continuous bridge mode implements a linear function of the position error, the linear function having its value and its first derivative at the first threshold equal to the value and the first derivative of the nonlinear function at the first threshold respectively.

12. A triple-mode control system for positioning the head of a disk drive, the control system comprising:
a proximate time-optimal controller (PTOC) mode having relatively large control output to rapidly move the head during track seeking operations;
a robust compensator mode having a relatively small control output to move the head in small increments during track following operations to compensate for friction and other nonlinearities;
a bridging controller mode to provide continuity of the control output when transitioning from the track seeking operation to the track following operation; and
a mode selector responsive to a position error signal to:
select the PTOC mode when the position error has a magnitude greater than a first selected threshold;
select the robust compensator mode when the position error has a magnitude less than a second selected threshold; and
select the bridging controller mode when the position error as a magnitude between the first threshold and the second threshold.

13. The triple-mode control system according to claim 12, wherein:
the PTOC mode implements a nonlinear function of the position error; and
the bridging controller mode implements a linear function the position error, the linear function having its value and its first derivative at the first threshold equal to the value and the first derivative of the nonlinear function at the first threshold respectively.

14. A control system for controlling the position of a disk drive head, said control system operable in
a seek mode, wherein position of said head is controlled using a non-linear function of position error ($y_e$);
a linear mode, wherein position of said head is controlled using proportional and derivative (PD) control; and
a tracking mode, wherein position of said head is controlled using a lag-lead compensator.

15. The controller of claim 14, wherein said lag-lead compensator has a transfer function of the form $$f(y_e) = \frac{k_f(\beta_1\tau_1 s + 1)(\tau_2 s + 1)y_e}{(\tau_1 s + 1)(\beta_1\tau_2 s + 1)}.$$

16. The controller of claim 15, wherein said controller switches between said seek mode, said linear mode and said tracking mode in dependence on a value of said position error ($y_e$).

17. The controller of claim 16, wherein said linear mode smoothes transition between said seek mode and said tracking mode.

18. The controller of claim 15, wherein said non-linear of position error ($y_e$) is of the form $$f_s(y_e) = sgn(y_e)\left(\sqrt{\frac{2\alpha l_m k_t k_v}{k_y}|y_e|} - \frac{l_m}{k_2}\right), \text{ for } |y_e| > y_s.$$

19. The controller of claim 18, wherein in said linear mode, position of said head is controlled using a transfer function of the form $$f_c(y_e) = \frac{k_1}{k_2}y_e + sgn(y_e)F_d, \text{ for } y_f < |y_e| \le y_s.$$

* * * * *

UNITED STATES PATENT AND TRADEMARK OFFICE
CERTIFICATE OF CORRECTION

PATENT NO. : 6,937,430 B2 Page 1 of 1
APPLICATION NO. : 10/169864
DATED : August 30, 2005
INVENTOR(S) : Shuzhi Ge et al.

It is certified that error appears in the above-identified patent and that said Letters Patent is hereby corrected as shown below:

Column 13
Claim 1, line 46, replace "pre-selecte" with -- pre-selected--

Column 16
Claim 18, line 45, replace "said non-linear of" with -- said non-linear function of --

Signed and Sealed this

Seventeenth Day of April, 2007

JON W. DUDAS
*Director of the United States Patent and Trademark Office*